United States Patent
Xu et al.

(10) Patent No.: US 11,989,923 B2
(45) Date of Patent: May 21, 2024

(54) GENERATING SEMANTIC SCENE GRAPHS FROM UNGROUNDED LABEL GRAPHS AND VISUAL GRAPHS FOR DIGITAL IMAGES

(71) Applicant: Adobe Inc., San Jose, CA (US)

(72) Inventors: Ning Xu, Milpitas, CA (US); Jing Shi, Rochester, NY (US)

(73) Assignee: Adobe Inc., San Jose, CA (US)

( * ) Notice: Subject to any disclaimer, the term of this patent is extended or adjusted under 35 U.S.C. 154(b) by 315 days.

(21) Appl. No.: 17/483,126

(22) Filed: Sep. 23, 2021

(65) Prior Publication Data

US 2023/0103305 A1    Apr. 6, 2023

(51) Int. Cl.

| | |
|---|---|
| G06K 9/46 | (2006.01) |
| G06F 18/21 | (2023.01) |
| G06F 18/22 | (2023.01) |
| G06F 40/205 | (2020.01) |
| G06K 9/62 | (2022.01) |
| G06N 3/02 | (2006.01) |
| G06V 10/426 | (2022.01) |

(52) U.S. Cl.
CPC .......... *G06V 10/426* (2022.01); *G06F 18/217* (2023.01); *G06F 18/22* (2023.01); *G06F 40/205* (2020.01); *G06N 3/02* (2013.01)

(58) Field of Classification Search
CPC ..... G06V 10/426; G06F 40/205; G06F 18/22; G06F 18/217; G06N 3/02
See application file for complete search history.

(56) References Cited

U.S. PATENT DOCUMENTS

| | | | |
|---|---|---|---|
| 2007/0183670 A1* | 8/2007 | Owechko ............ | G06F 18/2111 382/224 |
| 2023/0161061 A1* | 5/2023 | Denli .................... | G01V 1/345 702/14 |

OTHER PUBLICATIONS

Hakan Bilen and Andrea Vedaldi. Weakly supervised deep detection networks. In Proceedings of the IEEE Conference on Computer Vision and Pattern Recognition, pp. 2846-2854, 2016.
(Continued)

*Primary Examiner* — David F Dunphy
(74) *Attorney, Agent, or Firm* — Keller Preece PLLC

(57) ABSTRACT

This disclosure describes methods, non-transitory computer readable storage media, and systems that utilize weakly supervised graph matching to align an ungrounded label graph and a visual graph corresponding to a digital image. Specifically, the disclosed system utilizes a label embedding model to generate label graph embeddings from the ungrounded label graph and a visual embedding network to generate visual graph embeddings from the visual graph. Additionally, the disclosed system determines similarity metrics indicating the similarity of pairs of label graph embeddings and visual graph embeddings. The disclosed system then generates a semantic scene graph by utilizing a graph matching algorithm to align the ungrounded label graph and the visual graph based on the similarity metrics. In some embodiments, the disclosed system utilizes contrastive learning to modify the embedding models. Furthermore, in additional embodiments, the disclosed system utilizes the semantic scene graph to train a scene graph generation neural network.

20 Claims, 8 Drawing Sheets

(56) References Cited

OTHER PUBLICATIONS

Long Chen, Hanwang Zhang, Jun Xiao, Xiangnan He, Shiliang Pu, and Shih-Fu Chang. Counterfactual critic multi-agent training for scene graph generation. In Proceedings of the IEEE/CVF International Conference on Computer Vision, pp. 4613-4623, 2019.
Ting Chen, Simon Kornblith, Mohammad Norouzi, and Geoffrey Hinton. A simple framework for contrastive learning of visual representations. In International conference on machine learning, pp. 1597-1607. PMLR, 2020.
Kyunghyun Cho, Bart Van Merrienboer, Dzmitry Bahdanau, and Yoshua Bengio. On the properties of neural machine translation: Encoder-decoder approaches. arXiv preprint arXiv:1409.1259, 2014.
Minsu Cho, Jungmin Lee, and Kyoung Mu Lee. Reweighted random walks for graph matching. In European conference on Computer vision, pp. 492-505. Springer, 2010.
Apoorva Dornadula, Austin Narcomey, Ranjay Krishna, Michael Bernstein, and Fei-Fei Li. Visual relationships as functions: Enabling few-shot scene graph prediction. In Proceedings of the IEEE/CVF International Conference on Computer Vision Workshops, pp. 0-0, 2019.
Matthias Fey, Jan E Lenssen, Christopher Morris, Jonathan Masci, and Nils M Kriege. Deep graph matching consensus. arXiv preprint arXiv:2001.09621, 2020.
Steven Gold and Anand Rangarajan. A graduated assignment algorithm for graph matching. IEEE Transactions on pattern analysis and machine intelligence, 18(4):377-388, 1996.
Kaiming He, Xiangyu Zhang, Shaoqing Ren, and Jian Sun. Deep residual learning for image recognition. In Proceedings of the IEEE conference on computer vision and pattern recognition, pp. 770-778, 2016.
Roei Herzig, Moshiko Raboh, Gal Chechik, Jonathan Berant, and Amir Globerson. Mapping images to scene graphs with permutation-invariant structured prediction. Advances in Neural Information Processing Systems, 31:7211-7221, 2018.
Drew A Hudson and Christopher D Manning. Gqa: A new dataset for real-world visual reasoning and compositional question answering. In Proceedings of the IEEE/CVF Conference on Computer Vision and Pattern Recognition, pp. 6700-6709, 2019.
Drew A Hudson and Christopher D Manning. Learning by abstraction: The neural state machine. arXiv preprint arXiv:1907.03950, 2019.
Seong Jae Hwang, Sathya N Ravi, Zirui Tao, Hyunwoo J Kim, Maxwell D Collins, and Vikas Singh. Tensorize, factorize and regularize: Robust visual relationship learning. In Proceedings of the IEEE Conference on Computer Vision and Pattern Recognition, pp. 1014-1023, 2018.
Justin Johnson, Agrim Gupta, and Li Fei-Fei. Image generation from scene graphs. In Proceedings of the IEEE conference on computer vision and pattern recognition, pp. 1219-1228, 2018.
Andrej Karpathy and Li Fei-Fei. Deep visual-semantic alignments for generating image descriptions. InProceedings of the IEEE conference on computer vision and pattern recognition, pp. 3128-3137, 2015.
Ranjay Krishna, Yuke Zhu, Oliver Groth, Justin Johnson, Kenji Hata, Joshua Kravitz, Stephanie Chen, Yannis Kalantidis, Li-Jia Li, David A Shamma, et al. Visual genome: Connecting language and vision using crowdsourced dense image annotations. International journal of computer vision, 123(1):32-73, 2017.
Harold W Kuhn. The hungarian method for the assignment problem. Naval research logistics quarterly, 2(1-2):83-97, 1955.
Alina Kuznetsova, Hassan Rom, Neil Alldrin, Jasper Uijlings, Ivan Krasin, Jordi Pont-Tuset, Shahab Kamali, Stefan Popov, Matteo Malloci, Alexander Kolesnikov, et al. The open images dataset v4. International Journal of Computer Vision, pp. 1-26, 2020.
Marius Leordeanu and Martial Hebert. A spectral technique for correspondence problems using pairwise constraints. 2005.
Yikang Li, Wanli Ouyang, Bolei Zhou, Jianping Shi, Chao Zhang, and Xiaogang Wang. Factorizable net: an efficient subgraph-based framework for scene graph generation. In Proceedings of the European Conference on Computer Vision (ECCV), pp. 335-351, 2018.
Xin Lin, Changxing Ding, Jinquan Zeng, and Dacheng Tao. Gps-net: Graph property sensing network for scene graph generation. In Proceedings of the IEEE/CVF Conference on Computer Vision and Pattern Recognition, pp. 3746-3753, 2020.
Joao Maciel and Joao Paulo Costeira. A global solution to sparse correspondence problems. IEEE Transactions on Pattern Analysis and Machine Intelligence, 25(2):187-199, 2003.
Oded Maron and Tomas Lozano-P'erez. A framework for multiple-instance learning.Advances in neural information processing systems, pp. 570-576, 1998.
Antoine Miech, Jean-Baptiste Alayrac, Lucas Smaira, Ivan Laptev, Josef Sivic, and Andrew Zisserman. End-to-end learning of visual representations from uncurated instructional videos. In Proceedings of the IEEE/CVF Conference on Computer Vision and Pattern Recognition, pp. 9879-9889, 2020.
Tomas Mikolov, Kai Chen, Greg Corrado, and Jeffrey Dean. Efficient estimation of word representations in vector space. arXiv preprint arXiv:1301.3781, 2013.
Jeffrey Pennington, Richard Socher, and Christopher D Manning. Glove: Global vectors for word representation. In Proceedings of the 2014 conference on empirical methods in natural language processing (EMNLP), pp. 1532-1543, 2014.
Julia Peyre, Josef Sivic, Ivan Laptev, and Cordelia Schmid. Weakly-supervised learning of visual relations. In Proceedings of the IEEE international conference on computer vision, pp. 5179-5188, 2017.
Mengshi Qi, Weijian Li, Zhengyuan Yang, Yunhong Wang, and Jiebo Luo. Attentive relational networks for mapping images to scene graphs. In Proceedings of the IEEE/CVF Conference on Computer Vision and Pattern Recognition, pp. 3957-3966, 2019.
Shaoqing Ren, Kaiming He, Ross Girshick, and Jian Sun. Faster r-cnn: Towards real-time object detection with region proposal networks. In Advances in neural information processing systems, pp. 91-99, 2015.
Shaoqing Ren, Kaiming He, Ross Girshick, and Jian Sun. Faster r-cnn: towards real-time object detection with region proposal networks. IEEE transactions on pattern analysis and machine intelligence, 39(6):1137-1149, 2016.
Sebastian Schuster, Ranjay Krishna, Angel Chang, Li Fei-Fei, and Christopher D Manning. Generating semantically precise scene graphs from textual descriptions for improved image retrieval. In Proceedings of the fourth workshop on vision and language, pp. 70-80, 2015.
Piyush Sharma, Nan Ding, Sebastian Goodman, and Radu Soricut. Conceptual captions: A cleaned, hypernymed, image alt-text dataset for automatic image captioning. In Proceedings of ACL, 2018.
Kihyuk Sohn. Improved deep metric learning with multi-class n-pair loss objective. In Proceedings of the 30th International Conference on Neural Information Processing Systems, pp. 1857-1865, 2016.
Kaihua Tang, Yulei Niu, Jianqiang Huang, Jiaxin Shi, and Hanwang Zhang. Unbiased scene graph generation from biased training. In Proceedings of the IEEE/CVF Conference on Computer Vision and Pattern Recognition, pp. 3716-3725, 2020.
Kaihua Tang, Hanwang Zhang, Baoyuan Wu, Wenhan Luo, and Wei Liu. Learning to compose dynamic tree structures for visual contexts. In Proceedings of the IEEE Conference on Computer Vision and Pattern Recognition, pp. 6619-6628, 2019.
Damien Teney, Lingqiao Liu, and Anton van Den Hengel. Graph-structured representations for visual question answering. In Proceedings of the IEEE conference on computer vision and pattern recognition, pp. 1-9, 2017.
Runzhong Wang, Junchi Yan, and Xiaokang Yang. Learning combinatorial embedding networks for deep graph matching. In Proceedings of the IEEE/CVF International Conference on Computer Vision, pp. 3056-3065, 2019.
Runzhong Wang, Junchi Yan, and Xiaokang Yang. Graduated assignment for joint multi-graph matching and clustering with application to unsupervised graph matching network learning. Advances in Neural Information Processing Systems, 33, 2020.

(56) References Cited

OTHER PUBLICATIONS

Wenbin Wang, Ruiping Wang, Shiguang Shan, and Xilin Chen. Sketching image gist: Human-mimetic hierarchical scene graph generation. 2020.

Yu-Siang Wang, Chenxi Liu, Xiaohui Zeng, and Alan Yuille. Scene graph parsing as dependency parsing. arXiv preprint arXiv:1803.09189, 2018.

Zhirong Wu, Yuanjun Xiong, Stella X Yu, and Dahua Lin. Unsupervised feature learning via non-parametric instance discrimination. In Proceedings of the IEEE Conference on Computer Vision and Pattern Recognition, pp. 3733-3742, 2018.

Danfei Xu, Yuke Zhu, Christopher B Choy, and Li Fei-Fei. Scene graph generation by iterative message passing. In Proceedings of the IEEE conference on computer vision and pattern recognition, pp. 5410-5419, 2017.

Jianwei Yang, Jiasen Lu, Stefan Lee, Dhruv Batra, and Devi Parikh. Graph r-cnn for scene graph generation. In Proceedings of the European conference on computer vision (ECCV), pp. 670-685, 2018.

Xu Yang, Kaihua Tang, Hanwang Zhang, and Jianfei Cai. Auto-encoding scene graphs for image captioning. In Proceedings of the IEEE/CVF Conference on Computer Vision and Pattern Recognition, pp. 10685-10694, 2019.

Tianshu Yu, Runzhong Wang, Junchi Yan, and Baoxin Li. Learning deep graph matching with channel-independent embedding and hungarian attention. In International conference on learning representations, 2019.

Tianshu Yu, Junchi Yan, Yilin Wang, Wei Liu, and Baoxin Li. Generalizing graph matching beyond quadratic assignment model. In Proceedings of the 32nd International Conference on Neural Information Processing Systems, pp. 861-871, 2018.

Cong Yuren, Hanno Ackermann, Wentong Liao, Michael Ying Yang, and Bodo Rosenhahn. Nodis: Neural ordinary differential scene understanding. 2020.

Andrei Zanfir and Cristian Sminchisescu. Deep learning of graph matching. In Proceedings of the IEEE conference on computer vision and pattern recognition, pp. 2684-2693, 2018.

Alireza Zareian, Svebor Karaman, and Shih-Fu Chang. Weakly supervised visual semantic parsing. In Proceedings of the IEEE/CVF Conference on Computer Vision and Pattern Recognition, pp. 3736-3745, 2020.

Rowan Zellers, Mark Yatskar, Sam Thomson, and Yejin Choi. Neural motifs: Scene graph parsing with global context. In Proceedings of the IEEE Conference on Computer Vision and Pattern Recognition, pp. 5831-5840, 2018.

Hanwang Zhang, Zawlin Kyaw, Shih-Fu Chang, and Tat-Seng Chua. Visual translation embedding network for visual relation detection. InProceedings of the IEEE conference on computer vision and pattern recognition, pp. 5532-5540, 2017.

Hanwang Zhang, Zawlin Kyaw, Jinyang Yu, and Shih-Fu Chang. Ppr-fcn: Weakly supervised visual relation detectionvia parallel pairwise r-fcn. InProceedings of the IEEE International Conference on Computer Vision, pp. 4233-4241, 2017.

Ji Zhang, Kevin J Shih, Ahmed Elgammal, Andrew Tao, and Bryan Catanzaro. Graphical contrastive losses for scene graph generation. 2019.

Zhen Zhang and Wee Sun Lee. Deep graphical feature learning for the feature matching problem. InProceedings of the IEEE/CVF International Conference on Computer Vision, pp. 5087-5096, 2019.

Yiwu Zhong, Liwei Wang, Jianshu Chen, Dong Yu, and Yin Li. Comprehensive image captioning via scene graph decomposition. In European Conference on Computer Vision, pp. 211-229. Springer, 2020.

Feng Zhou and Fernando De la Torre. Factorized graph matching. In 2012 IEEE Conference on Computer Vision and Pattern Recognition, pp. 127-134. IEEE, 2012.

\* cited by examiner

GENERATING SEMANTIC SCENE GRAPHS FROM UNGROUNDED LABEL GRAPHS AND VISUAL GRAPHS FOR DIGITAL IMAGES

BACKGROUND

Advances in computer processing and machine learning have led to significant advancements in the field of digital image processing. Specifically, many systems provide digital image processing to understand scene construction and object relationships from digital images by utilizing machine-learning models (e.g., neural networks). For example, these systems attempt to generate representations of digital images including nodes and edges that indicate object entities and corresponding predicate relationships between the object entities, respectively. The resulting representations are useful in a variety of different applications such as visual question answering, digital image captioning, digital image editing or reconstruction, digital image generation, training machine-learning models (e.g., via dataset augmentation), or image classification. Conventional systems, however, suffer from a number of technical shortcomings, specifically with regard to the efficiency, flexibility, and accuracy of implementing computing devices in encoding and interpreting information from digital images.

SUMMARY

This disclosure describes one or more embodiments of methods, non-transitory computer readable media, and systems that solve the foregoing problems (in addition to providing other benefits) by utilizing a weakly supervised graph matching neural network to align an ungrounded label graph and a visual graph corresponding to a digital image. For example, the disclosed systems can reduce complexity and improve performance by utilizing an efficient first-order graph matching model optimized via contrastive learning to determine a correspondence between labels and objects portrayed in a digital image. Moreover, the disclosed systems can utilize this correspondence to learn parameters of a scene graph model. In this manner, the disclosed systems can efficiently and flexibly generate accurate semantic scene graphs for digital images.

To illustrate, in one or more embodiments, the disclosed systems utilize a label embedding neural network to generate label graph embeddings from entity labels in an ungrounded label graph. The disclosed systems also utilize a visual embedding neural network to generate visual graph embeddings from entity bounding regions in the visual graph. Additionally, the disclosed systems determine similarity metrics indicating the similarity of pairs of label graph embeddings and visual graph embeddings. The disclosed systems then generate a semantic scene graph by utilizing a first-order graph matching algorithm to align the entity labels in the ungrounded label graph with the entity bounding regions in the visual graph based on the similarity metrics. In some embodiments, the disclosed systems utilize the resulting semantic scene graph to further modify embedding models that generate the label graph embeddings and visual graph embeddings via contrastive learning. Furthermore, in additional embodiments, the disclosed systems utilize the semantic scene graph to build a scene graph generation neural network.

BRIEF DESCRIPTION OF THE DRAWINGS

The detailed description refers to the drawings briefly described below.

DETAILED DESCRIPTION

Figure 1:
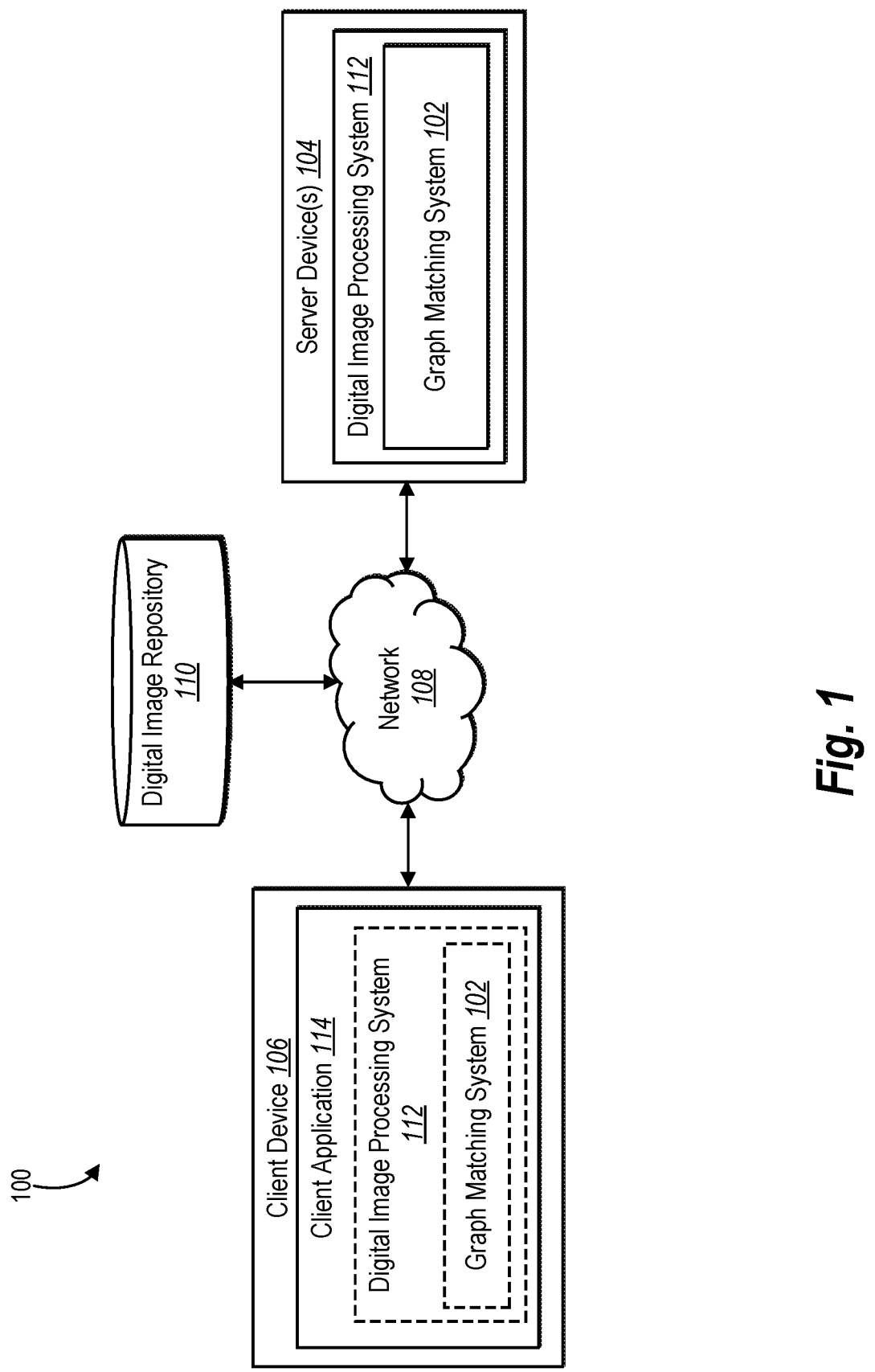
FIG. 1 illustrates a block diagram of a system environment in which a graph matching system is implemented in accordance with one or more implementations.

This disclosure describes one or more embodiments of a weakly-supervised graph matching system that aligns entities in ungrounded label graphs with visual graphs corresponding to digital images for scene graph generation. In particular, the graph matching system utilizes a first-order graph matching algorithm and multi-instance learning mechanism (with contrastive learning) to determine parameters for aligning ungrounded label graphs with visual graphs. To illustrate, in one or more embodiments, the graph matching system obtains a visual graph and an ungrounded label graph with limited annotations for a digital image. Additionally, the graph matching system utilizes embedding models to generate label graph embeddings for entity labels in the ungrounded label graph and visual graph embeddings for entity bounding regions in the visual graph. The graph matching system then utilizes a graph matching algorithm to generate a semantic scene graph based on similarities between the label graph embeddings and visual graph embeddings. In some embodiments, the graph matching system also utilizes contrastive learning to learn parameters of the embedding models based on the generated semantic scene graph. The graph matching system thus provides accurate, efficient, and flexible scene graph generation for improving scene graph generation neural networks and image processing for a variety of downstream visual reasoning applications.

As mentioned, in one or more embodiments, the graph matching system obtains ungrounded label graphs and visual graphs corresponding to digital images. For example, the graph matching system obtains an ungrounded label graph for a digital image by utilizing a natural language parsing model to extract entity labels from a description of the digital image (e.g., a caption for the digital image). Accordingly, the graph matching system generates the ungrounded label graph to represent entities and relationships from the digital image as nodes connected by a plurality of edges without incorporating specific location information for the entities into the ungrounded label graph. Additionally, the graph matching system obtains a visual graph for the digital image by utilizing digital image processing (e.g., object detection) to detect entity bounding regions within the digital image.

According to one or more embodiments, the graph matching system generates embeddings from an ungrounded label graph and a visual graph. Specifically, the graph matching system utilizes a label embedding model to generate label graph embeddings from entity labels in the ungrounded label graph. In some embodiments, the graph matching system also encodes edge information from the ungrounded label graph into the corresponding label graph embeddings. The graph matching system also utilizes a visual embedding model to generate visual graph embeddings from entity bounding regions in the visual graph.

In one or more additional embodiments, the graph matching system matches nodes from the ungrounded label graph to nodes of the visual graph. For example, the graph matching system matches nodes by determining similarities between pairs of label graph embeddings and visual graph embeddings. In particular, the graph matching system determines a similarity metric (e.g., a cosine similarity metric) between a label graph embedding and a visual graph embedding.

In connection with determining similarity metrics between label graph embeddings and visual graph embeddings, the graph matching system determines a bijective mapping (i.e., a one-to-one mapping) between nodes in an ungrounded label graph and a visual graph. To illustrate, the graph matching system utilizes a graph matching algorithm to determine correspondences between the label graph embeddings and the visual graph embeddings. In one or more embodiments, the graph matching system utilizes a first-order graph matching algorithm such as the Hungarian algorithm to align the nodes of the ungrounded label graph and nodes of the visual graph according to the similarity metrics. By aligning the nodes of the ungrounded label graph with the nodes of the visual graph, the graph matching system generates a semantic scene graph for the digital image.

According to one or more embodiments, after generating a semantic scene graph for a digital image, the graph matching system further trains one or more of the embedding models based on the semantic scene graph. Specifically, the graph matching system utilizes contrastive learning to compare label graph embeddings to positive and negative visual graph embeddings. The graph matching system then modifies parameters of one or more of the embedding models such that the label graph embeddings are closer to positive visual graph embeddings (e.g., reduced distance metrics) and further from negative visual graph embeddings (e.g., increased distance metrics). In additional embodiments, the graph matching system utilizes contrastive learning that compares visual graph embeddings to positive and negative samples and modifies parameters of the embedding models accordingly.

In additional embodiments, the graph matching system generates a semantic scene graph for training a scene graph generation neural network. For example, the graph matching system aligns an ungrounded label graph and a visual graph to generate a ground-truth semantic scene graph for a digital image. The graph matching system then utilizes the ground-truth semantic scene graph to determine a scene graph generation loss by comparing the ground-truth semantic scene graph to a semantic scene graph generated by the scene graph generation neural network. Additionally, the graph matching system modifies parameters of the scene graph generation neural network based on the scene graph generation loss.

Conventional image processing systems have a number of shortcomings in relation to accuracy, efficiency, and flexibility of operation. For example, many image processing systems utilize supervised models to generate scene graphs from digital images for downstream visual reasoning applications. While these conventional image processing systems are capable of generating semantic scene graphs for digital images, relying on heavily annotated digital images is inefficient. Specifically, manually annotated images require a significant amount of time, particularly for large image datasets. Additionally, intelligently annotated images (e.g., using neural networks) require significant computing resources.

Furthermore, conventional image processing systems are often unable to apply scene graph generation models to different domains. In particular, the conventional systems typically train scene graph generation models to specific datasets with limited domain applicability (e.g., for video question answering) for generating scene graphs relevant to the corresponding domains. Because the conventional systems utilize datasets corresponding to limited domains, the resulting scene graph generation models often provide inaccurate scene graphs for images with out-of-domain entities or relations. Accordingly, conventional systems often rigidly apply a particular model to specific image datasets and utilize a number of different models for datasets corresponding to other domains.

Additionally, conventional image processing systems can generate inaccurate scene graphs for digital images when relying on inaccurate input to scene graph generation models. For instance, because conventional systems rely on significant image annotations, inaccuracies in the annotations can result in inaccurate training of the models. To illustrate, training a scene graph generation model utilizing digital images with erroneous annotations indicating entities or relations in training digital images causes the parameters of the models to learn incorrect entity and relation features/weights. Verifying the accuracy of the annotations in training datasets can also be very difficult and time-consuming.

The disclosed graph matching system provides a number of advantages over conventional systems. For example, the graph matching system improves the efficiency of computing systems that train and/or implement scene graph generation neural networks for digital image processing. Specifically, in contrast to conventional systems that rely on expensive annotations of object locations and relations in digital images, the graph matching system utilizes a lightweight, weakly-supervised process for generating semantic scene graphs. More specifically, by utilizing a weakly-supervised approach with relaxed annotation requirements, the graph matching system provides more efficient scene graph generation while utilizing fewer computing resources and data verification time. In particular, the graph matching system is able to obtain entity/relation information for digital images from image descriptions (e.g., captions) using efficient natural language parsing models.

The graph matching system also provides additional flexibility to computing systems that utilize scene graph generation for digital image processing. In particular, in contrast to conventional systems that are typically applicable to a limited set of entity-relation domains, the graph matching system efficiently generates semantic scene graphs for a broad range of entity-relation domains for generalizing applicability of a scene graph generation neural network. For instance, the graph matching system is able to expand a training dataset to include digital images from multiple domains by leveraging the relaxed annotation requirements.

Additionally, the graph matching system improves the accuracy of computing systems that utilize scene graph generation for digital image processing. For example, by utilizing contrastive learning to train embedding models, the graph matching system provides improved correspondences between ungrounded label graphs and visual graphs. The graph matching system thus provides more accurate generation of semantic scene graphs based on limited annotation data for digital images. Furthermore, by improving the accuracy of semantic scene graphs generated via a weakly-supervised scene graph generation process, the graph matching system also provides more accurate ground truths for more accurately training scene graph generation models.

Turning now to the figures, FIG. 1 includes an embodiment of a system environment 100 in which a graph matching system 102 is implemented. In particular, the system environment 100 includes server device(s) 104 and a client device 106 in communication via a network 108. In one or more embodiments, as illustrated in FIG. 1, the system environment 100 also includes a digital image repository 110 in communication with the server device(s) 104 and/or the client device 106 via the network 108. Moreover, as shown, the server device(s) 104 include a digital image processing system 112, which includes the graph matching system 102. Additionally, the client device 106 includes a client application 114, which optionally includes the digital image processing system 112 and/or the graph matching system 102.

As shown in FIG. 1, the server device(s) 104 includes or hosts the digital image processing system 112. Specifically, the digital image processing system 112 includes, or is part of, one or more systems that implement digital image processing. For example, the digital image processing system 112 processes digital images for one or more visual reasoning tasks. To illustrate, the digital image processing system 112 processes digital images for visual question answering, digital image captioning, digital image editing or reconstruction, digital image generation, training machine-learning models (e.g., via dataset augmentation), or image classification. In some embodiments, the digital image processing system 112 provides tools for viewing, generating, editing, and/or otherwise interacting with digital content (e.g., digital images, digital videos) via the client application 114 of the client device 106. Additionally, in one or more embodiments, in response to performing one or more digital image processing tasks, the digital image processing system 112 provides results of the tasks (e.g., responses for visual question answering, digital image captions, edited/generated digital images, or trained models) for use or display at the client device 106 via the client application 114.

In one or more embodiments, a digital image includes a computer representation of visual information. For example, a digital image includes photos, computer-generated images, user-generated images, or digital videos (e.g., an individual frame of a digital video). Accordingly, in one or more embodiments, the digital image processing system 112 provides tools for generating or editing digital images by utilizing filters, masks, etc. to insert or modify objects within the digital images.

In connection with processing digital images, the digital image processing system 112 includes the graph matching system 102 to generate semantic scene graphs for use in one or more digital image processing tasks. In particular, the graph matching system 102 utilizes a graph matching process to align nodes of ungrounded label graphs and visual graphs corresponding to digital images for generating semantic scene graphs. For example, the graph matching system 102 utilizes embedding models to encode information from nodes of an ungrounded label graph and a visual graph into embeddings, respectively. The graph matching system 102 also generates a semantic scene graph by aligning the nodes in the ungrounded label graph and the visual graph based on similarities of the corresponding embeddings by utilizing a graph matching algorithm. In additional embodiments, the graph matching system 102 also utilizes contrastive learning to update the embedding models that the graph matching system 102 based on the semantic scene graph.

In one or more embodiments, an ungrounded label graph includes a connected set of nodes corresponding to entities in a digital image without positional information associated with the entities. Specifically, an ungrounded label graph includes entity labels that indicate entity (e.g., object) classes and edges that indicate relation labels corresponding to entities without information that indicates specific positions (e.g., coordinates) of the entities within a corresponding digital image. For example, an ungrounded label graph can include a set of nodes and edges generated from a description of a digital image (e.g., an image caption) that describes contents of the digital image but not the location of each content item.

Additionally, in one or more embodiments, a visual graph includes a set of nodes corresponding to positions of entities in a digital image. In particular, a visual graph includes a set of entity bounding regions that define positions of entities for specific portions (e.g., groups of pixels) of a digital image. For example, a visual graph includes a bounding box (or other shape) that encloses a portion of a digital image in which a particular entity is located. Furthermore, in one or more embodiments, a visual graph excludes entity classes and predicate classes corresponding to entities in a digital image.

According to one or more embodiments, an embedding model includes a computer representation that encodes data into one or more digital embeddings (e.g., from a dimensional space to a lower dimensional space). For example, an embedding model converts data into a vector representation (e.g., feature vectors). Thus, in one or more embodiments, a label embedding model encodes information from an entity label of a label graph into a label graph embedding, which represents the information from the entity label in a feature representation (e.g., a feature vector in a different dimensional space). Additionally, in one or more embodiments, a visual embedding model encodes information from an entity bounding region of a visual graph into a visual graph embedding, which represents the information from the entity bounding region in a different dimensional space. In some embodiments, an embedding model includes a neural network with learnable parameters for encoding features of visual or textual data. Alternatively, an embedding model includes an algorithm that converts data into a different dimensional space based on the features of the data according to a set of rules.

In one or more embodiments, a semantic scene graph (or "scene graph") includes a graph representation of a scene that includes geometric information for objects in the scene and semantic information for the scene. In particular, a semantic scene graph includes object instances and object relations indicating relative positioning of the object instances. Thus, a semantic scene graph includes two object nodes with edges that connect object nodes based on relationships corresponding to the nodes. In some embodiments, a semantic scene graph also represents relationships as relationship nodes connected to corresponding object nodes. A semantic scene graph thus represents object relationships and compositions in image scene data via a plurality of nodes and edges.

According to one or more embodiments, a graph matching algorithm includes a computer algorithm that aligns or matches graphs. For example, a graph matching algorithm utilizes similarity metrics (e.g., cosine similarity metrics, which is a measure of similarity between vectors of an inner product space) of a plurality of label graph embeddings and a plurality of visual graph embeddings to determine correspondences between the respective entity labels and entity bounding regions. In one or more embodiments, a graph matching algorithm includes a Hungarian algorithm for aligning nodes of an ungrounded label graph and a visual graph according to a predetermined budget or complexity. Additionally, in some embodiments, the graph matching system 102 utilizes a first-order graph matching algorithm to generate a semantic scene graph. In particular, a first order graph matching algorithm includes a graph matching algorithm that matches or aligns graphs based on a particular feature, such as a feature representation for nodes (in contrast to a second order graph matching algorithm that matches based on two features, such as features reflecting both nodes and edges).

In one or more embodiments, the graph matching system 102 utilizes semantic scene graphs generated via the graph matching process to modify a scene graph generation neural network. For example, the digital image processing system 112 utilizes one or more scene graph generation neural networks for performing one or more digital image processing operations via person detection, face detection, object detection, etc. The digital image processing system 112 can improve the performance of the one or more neural networks by utilizing the graph matching system 102 to modify parameters of the scene graph generation neural network(s). More specifically, the graph matching system 102 generates semantic scene graphs to utilize as ground-truth semantic scene graphs for training the scene graph generation neural network(s).

In one or more embodiments, a neural network includes a computer representation that is tuned (e.g., trained) based on inputs to approximate unknown functions. In particular, a neural network includes one or more layers (i.e., artificial neurons) that utilize algorithms to learn from, and make predictions on, known data by analyzing the known data to learn to generate outputs that reflect patterns and attributes of the known data. For example, a neural network makes high-level abstractions in data by generating data-driven predictions or decisions from the known input data. In some embodiments, a neural network includes, but is not limited to, a convolutional neural network, a recurrent neural network, a residual neural network, cascaded refinement neural network, or an adversarial neural network. For example, a scene graph generation neural network includes one or more convolutional layers, region based convolutional layers, multilayer perceptron layers, and/or other neural network layers.

In one or more embodiments, the server device(s) 104 include a variety of computing devices, including those described below with reference to FIG. 8. For example, the server device(s) 104 includes one or more servers for storing and processing data associated with digital content and neural networks. In some embodiments, the server device(s) 104 also include a plurality of computing devices in communication with each other, such as in a distributed storage environment. In some embodiments, the server device(s) 104 include a content server. The server device(s) 104 can also include an application server, a communication server, a web-hosting server, a social networking server, a digital content campaign server, or a digital communication management server.

In addition, as shown in FIG. 1, the system environment 100 includes the client device 106. In one or more embodiments, the client device 106 includes, but is not limited to, a mobile device (e.g., smartphone or tablet), a laptop, a desktop, including those explained below with reference to FIG. 8. Furthermore, although not shown in FIG. 1, the client device 106 can be operated by a user (e.g., a user included in, or associated with, the system environment 100) to perform a variety of functions. In particular, the client device 106 performs functions such as, but not limited to, accessing, generating, viewing, modifying, and otherwise interacting with digital content via the client application 114. The client device 106 also performs functions for generating, capturing, or accessing data related to digital content editing to provide to the digital image processing system 112 and the graph matching system 102 in connection with generating and modifying digital content or performing visual reasoning tasks. For example, the client device 106 communicates with the server device(s) 104 via the network 108 to provide digital content or user interactions to the server device(s) 104 or receive digital content from the server device(s) 104. Although FIG. 1 illustrates the system environment 100 with a single client device 106, the system environment 100 can include a different number of client devices.

Additionally, as shown in FIG. 1, the system environment 100 includes the network 108. The network 108 enables communication between components of the system environment 100. In one or more embodiments, the network 108 may include the Internet or World Wide Web. Additionally, the network 108 can include various types of networks that use various communication technology and protocols, such as a corporate intranet, a virtual private network (VPN), a local area network (LAN), a wireless local network (WLAN), a cellular network, a wide area network (WAN), a metropolitan area network (MAN), or a combination of two or more such networks. Indeed, the server device(s) 104 and the client device 106 communicates via the network using one or more communication platforms and technologies suitable for transporting data and/or communication signals, including any known communication technologies, devices, media, and protocols supportive of data communications, examples of which are described with reference to FIG. 8.

Although FIG. 1 illustrates the server device(s) 104, the client device 106, and the digital image repository 110 communicating via the network 108, in alternative embodiments, the various components of the graph matching system 102 communicate and/or interact via other methods (e.g., the server device(s) 104, the client device 106, and/or the digital image repository 110 can communicate directly). Furthermore, although FIG. 1 illustrates the graph matching system 102 being implemented by a particular component and/or device within the system environment 100, the graph matching system 102 can be implemented, in whole or in part, by other computing devices and/or components in the system environment 100 (e.g., the client device 106). In some embodiments, the digital image repository 110 is incorporated within the server device(s) 104 or the client device 106. Alternatively, the server device(s) 104 and/or the client device 106 may access digital images or data associated with digital images (e.g., captions) from a third-party system including the digital image repository 110 via the network 108.

In particular, in some implementations, the graph matching system 102 on the server device(s) 104 supports the graph matching system 102 on the client device 106. For instance, the graph matching system 102 on the server device(s) 104 utilizes one or more models or neural networks to generate a semantic scene graph. The graph matching system 102 then, via the server device(s) 104, provides the semantic scene graph to the client device 106 for performing one or more visual reasoning tasks or training one or more models at the client device 106. In other words, the client device 106 obtains (e.g., downloads) the semantic scene graph from the server device(s) 104 and utilizes the semantic scene graph to performing visual reasoning tasks independently from the server device(s) 104.

In alternative embodiments, the graph matching system 102 includes a web hosting application that allows the client device 106 to interact with content and services hosted on the server device(s) 104. To illustrate, in one or more implementations, the client device 106 accesses a web page supported by the server device(s) 104. The client device 106 provides input to the server device(s) 104 to perform digital content editing or visual reasoning tasks utilizing one or more semantic scene graphs, and, in response, the graph matching system 102 or digital image processing system 112 on the server device(s) 104 generates the semantic scene graphs and performs the tasks. The server device(s) 104 then provide the output or results of the tasks to the client device 106.

Figure 2:
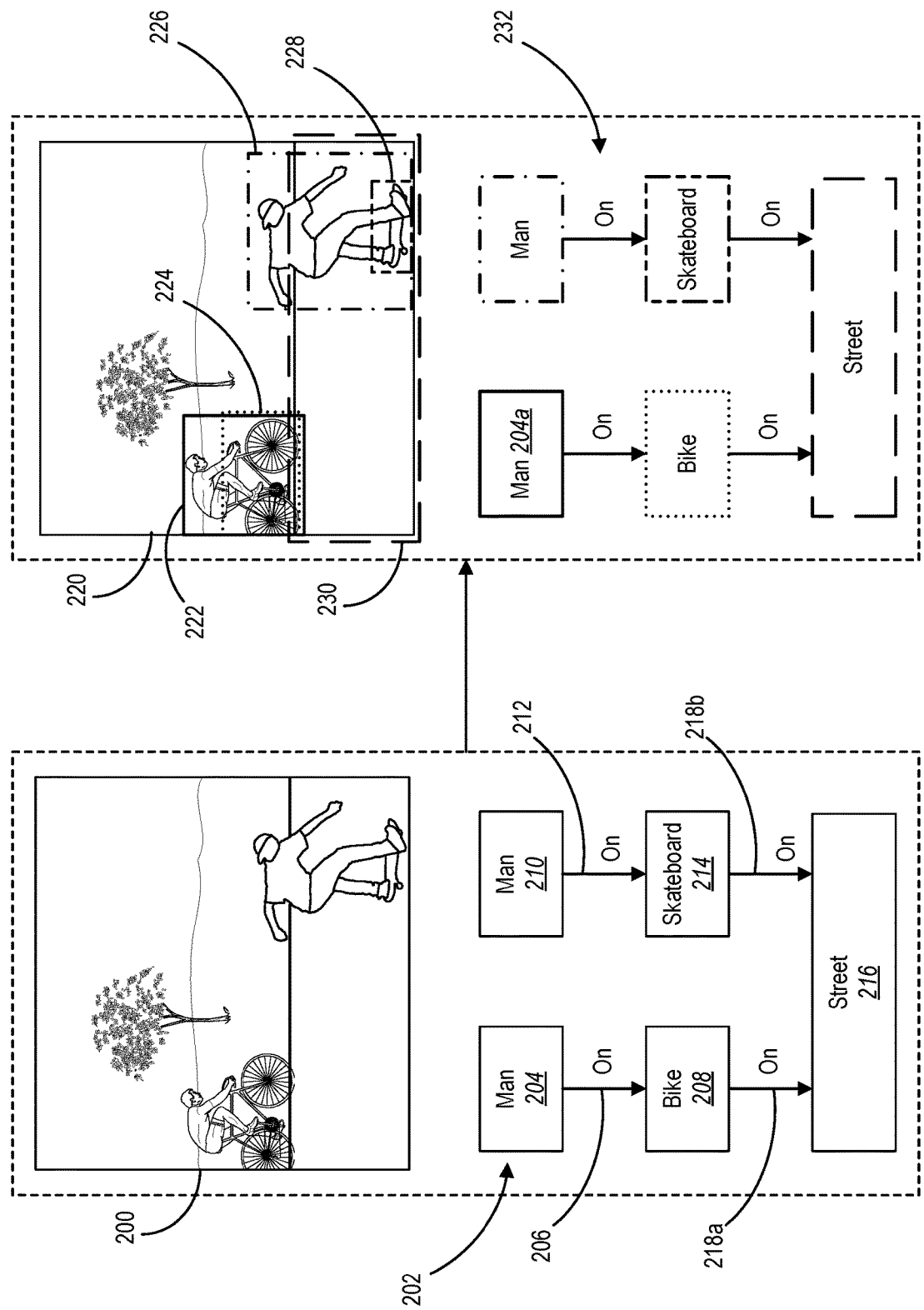
FIG. 2 illustrates a diagram of the graph matching system aligning entities of a visual graph and an ungrounded label graph in accordance with one or more implementations.

As mentioned, the graph matching system 102 generates semantic scene graphs from ungrounded label graphs and visual graphs corresponding to digital images. As illustrated in FIG. 2, the graph matching system 102 generates a semantic scene graph for a digital image utilizing a graph matching process. Specifically, the graph matching system 102 utilizes graph matching to process the digital image and information associated with a digital image and align data in an ungrounded label graph associated with the digital image to a visual graph for the digital image.

In one or more embodiments, the graph matching system 102 determines correspondences between entities in digital images and nodes in ungrounded label graphs associated with the digital images. For example, as illustrated in FIG. 2, a digital image 200 includes a plurality of entities in a scene. To illustrate, the digital image 200 includes a photograph of people participating in different activities including a first person riding on a bicycle and a second person riding on a skateboard. Additionally, as shown, the people and objects are located on a street within the scene with one or more additional objects in the background of the scene.

Additionally, FIG. 2 illustrates an ungrounded label graph 202 corresponding to the digital image 200. In one or more embodiments, the graph matching system 102 determines the ungrounded label graph 202 from a description of the digital image 200. As previously mentioned, the ungrounded label graph 202 includes a representation of the relative positioning of entities and relationships between the entities of the digital image 200. Accordingly, the ungrounded label graph 202 provides a semantic understanding of the contents of the digital image 200 without including exact positioning information for the entities.

Additionally, as illustrated in FIG. 2, the ungrounded label graph 202 includes a plurality of nodes representing entities of the digital image 200. For example, the ungrounded label graph 202 includes a first node 204 representing a first entity (e.g., a first man) of the digital image 200. Additionally, the ungrounded label graph 202 includes a first edge 206 connecting the first node 204 to a second node 208 representing a second entity (e.g., a bike) associated with the first entity (e.g., the first man is riding the bike). As shown, the ungrounded label graph 202 also includes a third node 210 representing a third entity (e.g., a second man) connected by a second edge 212 to a fourth node 214 representing a fourth entity (e.g., a skateboard) according to a relationship between the third entity and the fourth entity (e.g., the second man is riding the skateboard). The ungrounded label graph 202 further includes a fifth node 216 representing a fifth entity (e.g., a street) connected to the second node 208 and the fourth node 214 via additional edges 218a, 218 b indicating relationships between the fifth entity and the second entity and the fourth entity (e.g., the bike and skateboard are located on the street).

In one or more embodiments, the graph matching system 102 determines correspondences between entities in the digital image 200 and the corresponding nodes in the ungrounded label graph 202 via graph matching. In particular, the graph matching system 102 determines a visual graph 220 for the digital image 200 including a plurality of nodes representing the entities. For instance, the graph matching system 102 determines a plurality of entity bounding regions corresponding to the entities including a first entity bounding region 222 corresponding to the first entity, a second entity bounding region 224 corresponding to the second entity, a third entity bounding region 226 corresponding to the third entity, a fourth entity bounding region 228 corresponding to the fourth entity, and a fifth entity bounding region 230 corresponding to the fifth entity. In one or more alternative embodiments, the graph matching system 102 obtains the visual graph 220 from another system (e.g., an existing visual graph for the digital image 200).

In one or more embodiments, the graph matching system 102 determines the entity bounding regions of the visual graph 220 for entities by utilizing an object detection neural network or other image processing models. Specifically, the graph matching system 102 determines pixel regions corresponding to detected entities. Additionally, in some embodiments, the graph matching system 102 determines an entity bounding region by determining a set of pixels of the digital image 200 that encompasses a detected entity. For example, the entity bounding region includes a bounding box with a minimum size to include the detected entity. Alternatively, the entity bounding region includes a different shape or size for encompassing the detected entity.

As previously indicated, the visual graph 220 includes the entity bounding regions (e.g., positional information for detected entities) without entity classes or relation information for the entities. Accordingly, the graph matching system 102 utilizes graph matching to determine correspondences between the data in the visual graph 220 and the ungrounded label graph 202. Specifically, the graph matching system 102 determines that the first node 204 corresponds to the first entity bounding region 222, the second node 208 corresponds to the second entity bounding region 224, etc. Accordingly, the graph matching system 102 generates a semantic scene graph 232 to include the entity and relationship information from the ungrounded label graph 202 with the positional information from the visual graph 220. For instance, FIG. 2 illustrates that the semantic scene graph 232 includes a modified first node 204a to include the correspondence between the modified first node 204a and the first entity bounding region 222. The semantic scene graph 232 similarly includes the correspondences to the entity bounding regions of the visual graph 220 for the other nodes from the ungrounded label graph 202.

Figure 3:
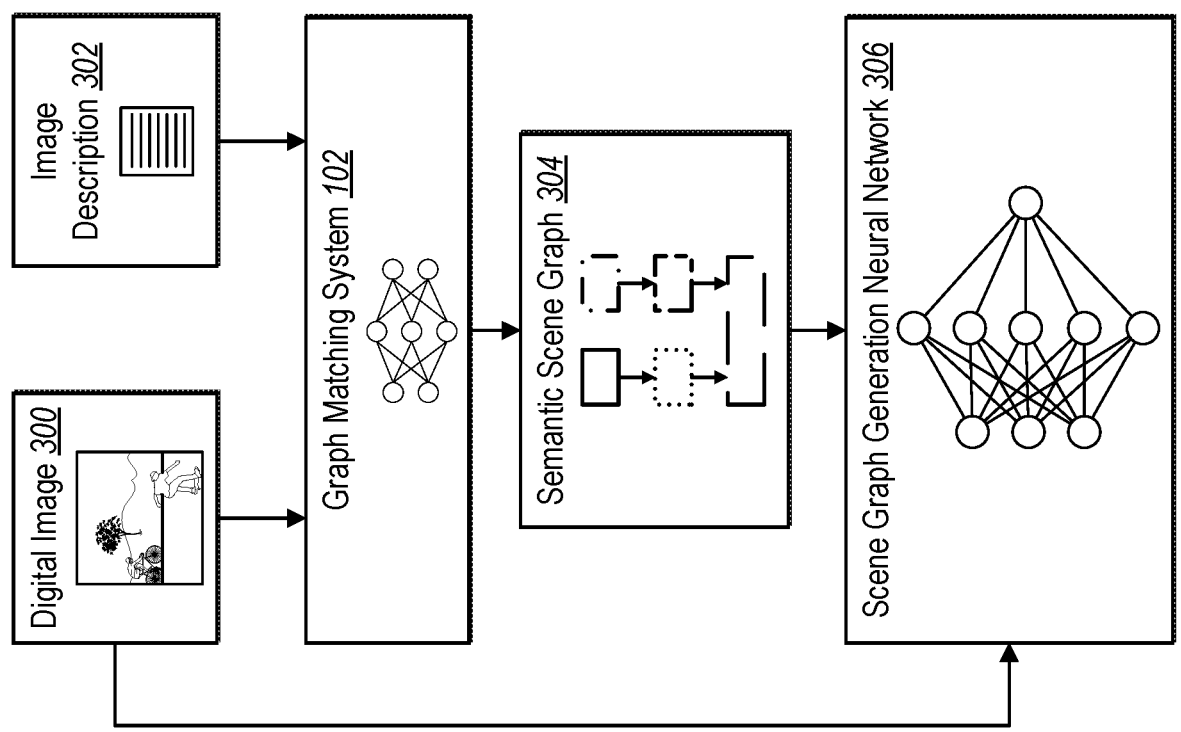
FIG. 3 illustrates a diagram of the graph matching system generating a semantic scene graph for training a scene graph generation neural network in accordance with one or more implementations.

In one or more embodiments, the graph matching system 102 utilizes graph matching to generate semantic scene graphs for one or more visual reasoning tasks. For example, as mentioned, the graph matching system 102 generates semantic scene graphs for use in training one or more neural networks to perform one or more visual reasoning tasks. FIG. 3 illustrates an embodiment of the graph matching system 102 generating a semantic scene graph for training a scene graph generation neural network that generates semantic scene graphs for visual reasoning tasks.

To illustrate, in one or more embodiments, the graph matching system 102 utilizes a digital image 300 and an image description 302 to generate a semantic scene graph 304. In particular, the graph matching system 102 utilizes the digital image 300 to generate a visual graph including entity bounding regions for entities in the digital image 300. Additionally, the graph matching system 102 utilizes the image description 302 (e.g., an image caption including a description of entities and/or entity relationships) associated with the digital image 300.

After generating a visual graph and an ungrounded label graph based on the digital image 300 and the image description 302, respectively, in one or more embodiments, the graph matching system 102 utilizes a graph matching process to determine correspondences between nodes of the visual graph and the ungrounded label graph. For instance, the graph matching system 102 determines the correspondences between the visual graph and the ungrounded label graph by generating embeddings of the nodes in the respective graphs and then comparing the embeddings to find the nodes that are most similar to each other. To illustrate, the graph matching system 102 utilizes a graph matching algorithm to determine the correspondences based on similarity metrics that indicate the similarity of the node embeddings in the visual graph and the ungrounded label graph.

In one or more additional embodiments, the graph matching system 102 generates the semantic scene graph 304 based on the correspondences between the visual graph and the ungrounded label graph. Specifically, the graph matching system 102 generates the semantic scene graph 304 to include a plurality of entity nodes corresponding to entities (including positional information) in the digital image 300. Additionally, the graph matching system 102 generates the semantic scene graph 304 to include a plurality of relationship edges connecting entity nodes to indicate relationships between the entities. In some embodiments, the graph matching system 102 utilizes relationship information from the ungrounded label graph to generate the relationship edges between the entity nodes and incorporate the information about entity relationships into the semantic scene graph 304.

According to one or more embodiments, the semantic scene graph 304 includes a scene graph that serves as a pseudo ground-truth semantic scene graph for training the scene graph generation neural network 306. More specifically, the scene graph generation neural network 306 generates semantic scene graphs from digital images for performing visual reasoning tasks based on, for example, scene construction, object detection, or object relationships. Accordingly, the graph matching system 102 utilizes the semantic scene graph 304 to train the scene graph generation neural network 306 to more accurately generate a semantic scene graph for the digital image 300.

Figure 4:
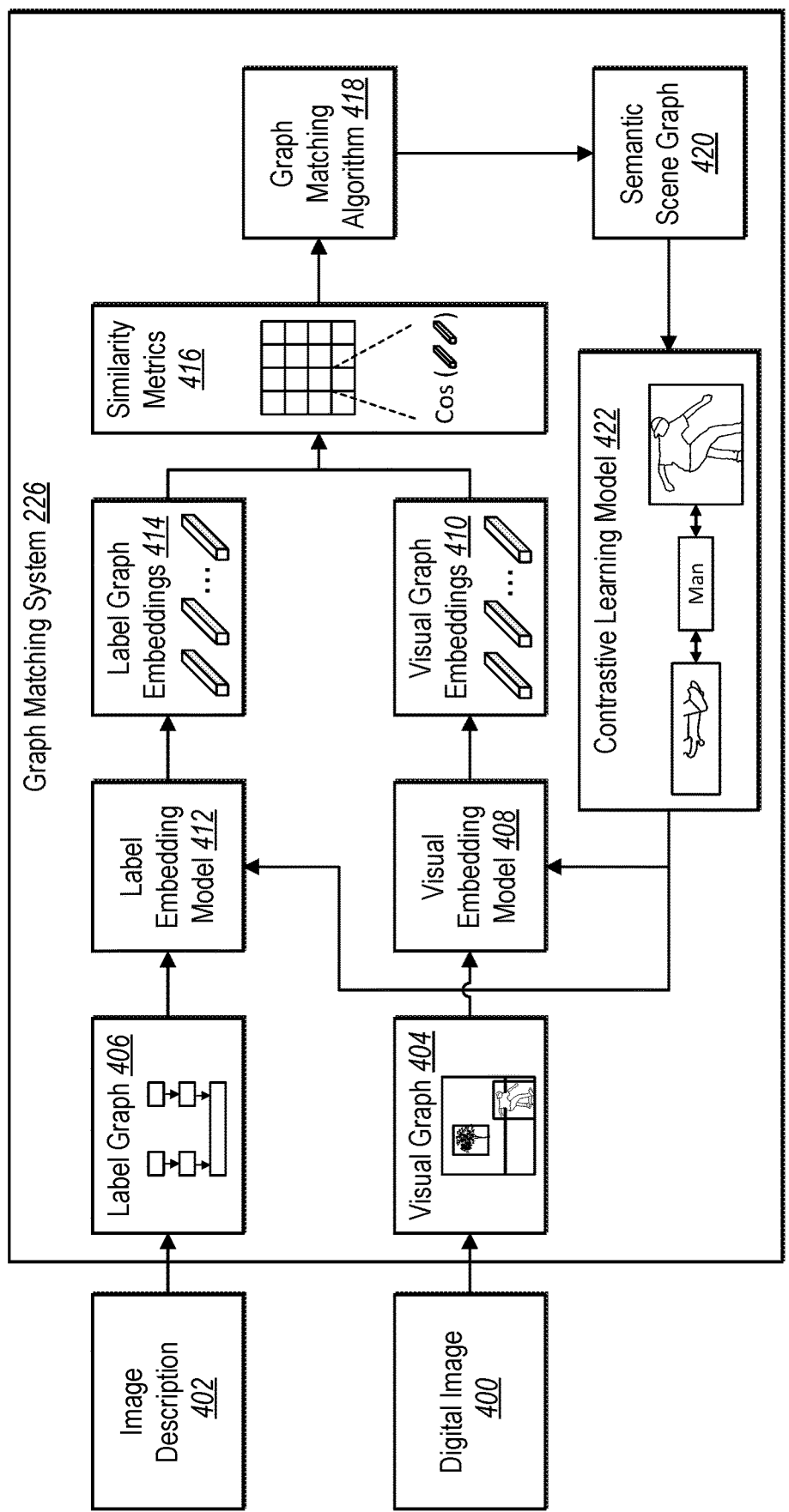
FIG. 4 illustrates a diagram of the graph matching system generating a semantic scene graph and modifying embedding models via contrastive learning in accordance with one or more implementations.

FIG. 4 illustrates a detailed diagram of the graph matching system 102 utilizing graph matching to generate semantic scene graphs for digital images. In particular, the graph matching system 102 utilizes a plurality of operations in the graph matching process for generating a semantic scene graph based on a digital image 400 and an image description 402 associated with the digital image 400. Additionally, FIG. 4 illustrates that the graph matching system 102 utilizes contrastive learning to learn embedding models for more accurate graph matching.

As illustrated in FIG. 4, the graph matching system 102 generates a visual graph 404 of the digital image 400. For example, as described above with respect to FIG. 2, the graph matching system 102 generates the visual graph 404 by determining a plurality of entity bounding boxes corresponding to detected entities in the digital image 400. The visual graph 404 thus includes position information (e.g., pixel regions) for each of a plurality of detected entities in the digital image 400. In some embodiments, the graph matching system 102 generates the visual graph 404 to include entity bounding boxes for all detected objects in the digital image 400. Alternatively, the graph matching system 102 generates the visual graph 404 to include entity bounding boxes for a subset of detected objects in the digital image 400 (e.g., for objects detected in the foreground of the digital image 400, specific types of objects, or objects within a specific portion of the digital image 400).

In addition to generating the visual graph 404, the graph matching system 102 also generates a label graph 406 (i.e., an ungrounded label graph) based on the image description 402. For example, the graph matching system 102 generates the label graph based on an image caption including a description of the contents of the digital image 400. To illustrate, the graph matching system 102 obtains the image description 402 from a database of captions associated with a plurality of digital images. In one or more embodiments, the image description 402 includes a manually generated (e.g., user-generated generated) caption for the digital image 400 from the database of captions associated with the plurality of digital images.

FIG. 4 illustrates that the graph matching system 102 generates embeddings from the visual graph 404 and the label graph 406. Specifically, the graph matching system 102 utilizes a visual embedding model 408 to generate label graph embeddings 414 from the visual graph 404. For instance, the graph matching system 102 utilizes the visual embedding model 408 to generate a first visual graph embedding for a first entity bounding region in the visual graph 404. Additionally, the graph matching system 102 utilizes the visual embedding model 408 to generate a second visual graph embedding for a second entity bounding region in the visual graph 404, etc. As mentioned previously, the visual graph 404 excludes relation information or entity classes for the entities in the digital image 400. Accordingly, the visual graph embeddings 410 can also exclude representations of entity relations or entity classes.

FIG. 4 illustrates that the graph matching system 102 utilizes a label embedding model 412 to generate label graph embeddings 414 from the label graph 406. In particular, the graph matching system 102 utilizes the label embedding model 412 to generate a first label graph embedding for a first entity label in the label graph 406. The graph matching system 102 also utilizes the label embedding model 412 to generate a second label graph embedding for a second entity label in the label graph 406.

According to one or more embodiments, an embedding model includes an embedding neural network. For example, the label embedding model 412 and/or the visual embedding model 408 includes a multilayer perceptron neural network. Accordingly, the graph matching system 102 utilizes the multilayer perceptron neural network to encode information from a given node in the label graph 406 or the visual graph 404 into an embedding. In some implementations, by utilizing a multilayer perceptron neural network to generate an embedding, the graph matching system 102 excludes edge information from the embedding. Thus, if the label embedding model 412 includes a multilayer perceptron neural network, the label embedding model 412 encodes information from the entity labels in the label graph 406 (and can exclude relationship information from the edges of the label graph 406 into the embeddings).

In one or more alternative embodiments, the label embedding model 412 and/or the visual embedding model 408 includes a graph neural network. By utilizing a graph neural network to generate an embedding, the graph matching system 102 can include edge information in the embedding. For instance, the graph matching system 102 utilizes a graph neural network that encodes edge information into a node by processing node pairs with a message passing scheme with edge type awareness. To illustrate, the graph matching system 102 utilizes the graph neural network to process a plurality of node pairs in the label graph 406 to determine whether each node pair includes an edge pointing from one node to another node (e.g., based on scores for the corresponding edges). The graph matching system 102 then encodes the edge information for each node based on the resulting scores to capture at least partial relationship information in the corresponding label graph embedding.

According to one or more embodiments, the first entity bounding region of the visual graph 404 corresponds to the first entity label of the label graph 406. The graph matching system 102 determines that the first entity bounding region corresponds to the first entity label by comparing the corresponding embeddings. To illustrate, the graph matching system 102 utilizes an algorithm or model to compare a visual graph embedding corresponding to the first entity bounding region to a label graph embedding corresponding to the first entity label. For instance, the graph matching system 102 utilizes a cosine similarity algorithm to generate similarity metrics 416 (e.g., cosine similarity metrics) for a plurality of label graph embedding/visual graph embedding pairs. The graph matching system 102 can also utilize other similarity algorithms.

As illustrated in FIG. 4, the graph matching system 102 utilizes a graph matching algorithm 418 to generate a semantic scene graph 420 based on the similarity metrics 416. In one or more embodiments, the graph matching system 102 utilizes the graph matching algorithm 418 to determine a bijective mapping (e.g., a one-to-one alignment) for the visual graph embeddings 410 and the label graph embeddings 414. For instance, the graph matching system 102 utilizes a first-order graph matching algorithm that matches nodes (without matching edges) in one-to-one correspondences from the visual graph 404 and the label graph 406 according to the similarity metrics 416. In one or more embodiments, the graph matching algorithm 418 includes a Hungarian algorithm as described by Harold W. Kuhn in "The Hungarian method for the assignment problem," in *Naval research logistics quarterly*, 2 (1-2):83-97 (1955), which is herein incorporated by reference in its entirety.

As previously mentioned, the graph matching system 102 generates the semantic scene graph 420 based on the determined correspondences between the nodes of the visual graph 404 and the label graph 406. For instance, after determining the bijective mapping for the visual graph 404 and the label graph 406, the graph matching system 102 utilizes the relationship information from the label graph 406 to complete the semantic scene graph 420. Specifically, the graph matching system 102 includes the relationship edges and entity information from the label graph 406 in the semantic scene graph 420 to provide relation information between entities and entity classes while also including the position information for the entities from the visual graph 404. In one or more embodiments, the graph matching system 102 generates the semantic scene graph 420 by modifying the label graph 406 to connect the entity labels in the label graph 406 to the corresponding positions (e.g., entity bounding regions) in the digital image 400 based on the visual graph 404. Alternatively, the graph matching system 102 generates the semantic scene graph 420 by modifying the visual graph 404 to insert the appropriate relationship edges based on matched nodes from the label graph 406.

In one or more additional embodiments, the graph matching system 102 improves the accuracy of the embedding models (and therefore, the resulting embeddings and semantic scene graphs) via contrastive learning. In particular, as illustrated in FIG. 4, the graph matching system 102 utilizes a contrastive learning model 422 to modify parameters of the visual embedding model 408 and/or the label embedding model 412. To illustrate, the graph matching system 102 utilizes contrastive learning to force matching embeddings to be closer while forcing unmatched embeddings to be further apart by modifying parameters of the visual embedding model 408 and/or the label embedding model 412. In some embodiments, the graph matching system 102 modifies the parameters of only one of the visual embedding model 408 or the label embedding model 412 based on the contrastive learning model 422. In alternative embodiments, the graph matching system 102 modifies parameters of both embedding models in a joint training process.

For example, the contrastive learning model 422 compares a particular embedding to a positive embedding sample and at least one negative embedding sample. To illustrate, the contrastive learning model 422 compares a label graph embedding for a node in the label graph 406 to a positive (e.g., matched) visual graph embedding for a matched node in the visual graph 404. Additionally, the contrastive learning model 422 then compares the label graph embedding to negative (e.g., unmatched) visual graph embeddings for unmatched nodes in the visual graph 404 (or nodes in other images/image frames associated with the digital image 400). Alternatively, the contrastive learning model 422 compares a visual graph embedding to a positive label graph embedding and negative label graph embeddings. The contrastive learning model 422 thus determines a contrastive loss based on distances (in feature space) between a selected embedding and the corresponding positive and negative embeddings.

The graph matching system 102 then utilizes the contrastive loss determined by the contrastive learning model 422 to modify the parameters of the model embeddings. For instance, the graph matching system 102 utilizes the contrastive loss to modify parameters of the visual embedding model 408 and/or the label embedding model 412 to reduce distances between identified embeddings and the corresponding positive embeddings in a feature space. Additionally, the graph matching system 102 utilizes the contrastive loss to modify parameters of the visual embedding model 408 and/or the label embedding model 412 to increase distances between the identified embeddings and the corresponding negative embeddings.

According to one or more implementations, the graph matching system 102 performs a graph matching process for generating a semantic scene graph from an image I. For example, the graph matching system 102 utilizes graph matching to generate a semantic scene graph from a visual graph as $G=(\mathcal{N}, \varepsilon)$, where each node is a bounding region $b_i$ paired with an entity class $c_i \in \mathcal{C}_e$ and each edge is a predicate class $p_{ij} \in \mathcal{C}_p$ connecting subject node i and object node j—i.e., $\mathcal{N}_v = \{(b_i, c_i)\}^{n_e}_{i=1}$, $\varepsilon_v = \{p_{ij}\}^{n_e}_{i,j=1}$. In an initial stage, the graph matching system 102 utilizes a visual graph with unknown entity and predicate classes for a digital image. Additionally, the graph matching system 102 utilizes an ungrounded label graph as $G'=(\mathcal{N}', \varepsilon')$, where $\mathcal{N}'=\{c_i\}_{i=1}^{n'_e}$ and $\varepsilon'=\{p_{ij}\}_{i,j=1}^{n'_e}$. Furthermore, the label graph excludes location information for each entity node. Accordingly, the graph matching system 102 aligns the visual graph and the label graph to generate the semantic scene graph.

In one or more embodiments, a weakly-supervised graph matching process determines G and G' corresponding to a digital image without initially knowing the exact node correspondences. In some embodiments, the graph matching system 102 first determines an input visual node feature e as a region of interest pooling feature concatenating a feature b processed by a multilayer perceptron, where $b \in \mathbb{R}^9$ includes normalized coordinate $(x_1, y_1, x_2, y_2)$, center $$\left(\frac{x_1+x_2}{2}, \frac{y_1+y_2}{2}\right),$$

size $(x_2-x_1, y_2-y_1)$, and area $(x_2-x_1)(y_2-y_1)$. Additionally, the input label node feature e' represents an embedding of the object class generated by an embedding model. In one or more embodiments, the graph matching system 102 utilizes an embedding model as described by Jeffrey Pennington, Richard Socher, and Christopher D. Manning in "GloVe: Global vectors for word representation" in *Proceedings of the 2014 conference on empirical methods in natural language processing (EMNLP)*, pages 1532-1543 (2014), which is herein incorporated by reference in its entirety. Alternatively, the graph matching system 102 utilizes an embedding model as described by Tomas Mikolov, Kai Chen, Greg Corrado, and Jeffrey Dean in "Efficient estimation of word representations in vector space" in arXiv: 1301.3781 (2013). The graph matching system 102 can utilize a variety of different embedding models to generate embeddings.

According to one or more embodiments, the graph matching system 102 utilizes two embedding models F, F' to encode the node features e, e', respectively, resulting in the embedding of node I in G as $h_i$ and node j in G' as $h'_j$. In some embodiments, the graph matching system 102 first performs graph matching of the nodes and then learns parameters in F and F' through contrastive learning. For graph matching, the graph matching system 102 utilizes a graph matching algorithm (e.g., a first-order graph matching process) to match the nodes.

In additional embodiments, the graph matching system 102 computes the cosine similarity (e.g., cosine similarity metrics) between two nodes as $S_{ij}=\cos(h_i, h'_j)$. The graph matching system 102 then utilizes the graph matching algorithm to determine a one-to-one alignment $\mathcal{J}$ between two graphs $\mathcal{J}=\{(i,j)|i\in\{1\ldots n_e\}, j\in\{1\ldots n'_e\}\}$ such that $$\mathcal{J}^* = \underset{\mathcal{J}}{\operatorname{argmax}} \sum_{(i,j)\in\mathcal{J}} s_{ij}.$$

In one or more embodiments, the graph matching system 102 solves for n optimal alignment $\mathcal{J}^*$ utilizing a first-order graph matching algorithm such as the Hungarian algorithm, which has a complexity of $\mathcal{O}(n^3)$. In some implementations, the embedding model can encode edge context, which allows the graph matching algorithm to function with higher-order graph matching.

To learn the parameters of one or both of the embedding models, graph matching system 102 utilizes a triplet loss to enhance alignment of the nodes in the visual graph and the label graph by forcing the similarity of the matched nodes and distancing the unmatched nodes. Accordingly, the resulting graph matching loss (or contrastive loss) is represented as $L_{gm}=\sum(i,j)\in\mathcal{J}^*$, i≠i', j≠j'max $(0s_{ij'}-s_{ij}+\Delta)$, in which $\Delta$ is a positive margin. According to one or more embodiments, the graph matching system 102 determines the negative embeddings (e.g., negative visual graph embeddings and/or negative label graph embeddings) for contrastive learning from the unmatched objects in the digital image or for other images associated with the digital image (e.g., other image frames within a digital video that includes the digital image).

As previously mentioned, in one or more embodiments, the graph matching system 102 utilizes an embedding model including a multilayer perceptron. In alternative embodiments, the graph matching system 102 utilizes an embedding model that includes a graph neural network that encodes categorical edge information from a label graph into a node representation. More specifically, the graph matching system 102 utilizes a graph neural network that explicitly encodes edge type features into the node representation. For instance, an initial node state is an input node embedding $h_i^0=e_i$. At the kth iteration, the graph neural network generates a confidence score to measure the confidence of whether an edge exists pointing from node i to node j as $\beta_{ij}^{(k)}=\text{Sigmoid}(f_\beta([h_i^{(k)}; h_j^{(k)}])$, where [';'] represents concatenation of two vectors, and f represents a multilayer perceptron.

Additionally, $D_p \in \mathbb{R}^{|\mathcal{C}_p|\times d}$ represents an embedding dictionary of all predicates in $\mathcal{C}_p$ where the first predicate is the background class. A valid predicate dictionary $\hat{D}_p \in$ is $D_p$ without the background embedding. To enforce the message-passing process to be aware of the edge type, the graph matching system 102 determines an attention score from the pairwise node feature to the valid dictionary as $\hat{\alpha}_{ij}^{(k)}=\text{Softmax}[f_\alpha([h_i^{(k)}; h_j^{(k)}]) D_p^T/\sqrt{d}$. In the embodiment in which the graph matching system 102 does not identify a valid relation type between two nodes, the graph matching system 102 augments the predicate attention with edge confidence such that it attends to the background class, and obtains the attended predicate representation from the augmented attention as $\alpha_{ij}^{(k)}=[1-\beta_{ij}^{(k)}; \beta_{ij}^{(k)}\hat{\alpha}_{ij}^{(k)}, p_{ij}^{(k)}=\alpha_{ij}^{(k)}D_p$.

The graph matching system 102 also aggregates neighbor information for each node through both subject and object fully connected layers as $m_i^{(k)}=\Sigma_{j\neq i}(\bar{\beta}_{ij}^{(k)}f_s([h_j^{(k)}; p_{ij}^{(k)}])+\bar{\beta}_{ji}^{(k)}f_o([h_j^{(k)}; p_{ji}^{(k)}]))$, where $\bar{\beta}_{ji}^{(k)}=\beta_{ij}^{(k)}/\Sigma_{j\neq i}\beta_{ij}^{(k)}$. The above aggregation also considers the predicate type, which enables the message passing process to be aware of the relation categories. Furthermore, in one or more embodiments, the graph matching system 102 updates the node feature as $h_i^{(k+1)}=\text{GRU}(h_i^{(k)}, m_i^{(k)})$ utilizing GRU as described by Kyunghyun Cho, Bart Van Merrienboer, Dzmitry Bandanau, and Yoshua Bengio in "On the properties of neural machine translation: Encoder-decoder approaches" in *arXiv preprint arXiv*:1409.1259 (2014). After K iterations, the graph matching system 102 determines the refined node feature with edge type context as $h_i^K$.

In one or more embodiments, the graph matching system 102 formulates the above message passing information with soft attention to the predicate type, suitable for the visual graph (which excludes the predicate category). Because the label graph has the determined relation type, the graph matching system 102 adopts hard attention instead of soft attention. This results in $\beta_{ij}$ in the measured confidence score above as:

$$\beta_{ij}^{(k)} = \begin{cases} 0 & \text{if } p_{ij} = \text{background,} \\ 1 & \text{otherwise.} \end{cases}$$

and $\alpha_{ij}^{(k)} \in \mathbb{R}^{|\mathcal{C}_p|}$ in the attention score is instead changed to a one-hot vector indicating the predicate category of $p_{ij}$. In some embodiments, the graph matching system 102 increases the message passing count to encode the edge context into an embedding for a node for higher-order graph matching.

As mentioned, in some embodiments, the graph matching system 102 utilizes a semantic scene graph generated via graph matching to train a scene graph generation neural network. In one or more embodiments, the graph matching system 102 first utilizes a weakly-supervised graph matching process between a visual graph and a label graph associated with a digital image to obtain class labels for nodes and edges in the visual graph, as described above. The graph matching system 102 then trains the scene graph generation neural network from the semantic scene graph. The graph matching system 102 thus attunes one or more scene graph generation neural networks via the weakly-supervised graph matching process.

Figure 5:
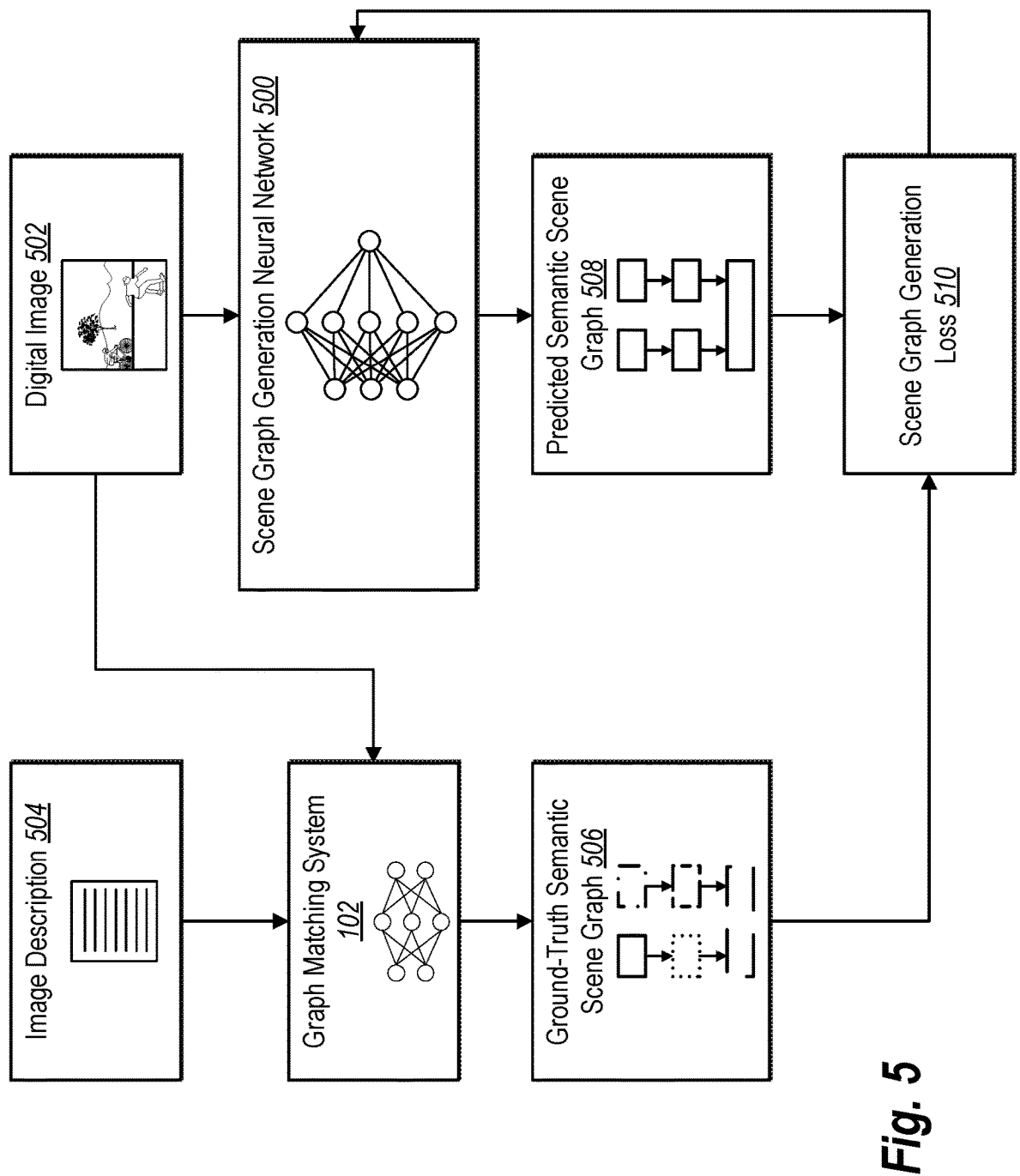
FIG. 5 illustrates a diagram of the graph matching system modifying generating a ground-truth semantic scene graph for modifying parameters of a scene graph generation neural network in accordance with one or more implementations.

FIG. 5 illustrates an embodiment in which the graph matching system 102 utilizes a graph matching process to generate semantic scene graphs for training a scene graph generation neural network 500. In particular, the graph matching system 102 utilizes a digital image 502 and an image description 504 associated with the digital image 502 to generate a ground-truth semantic scene graph 506. For instance, the graph matching system 102 utilizes a graph matching process to determine a one-to-one correspondence between nodes in a visual graph generated from the digital image 502 and nodes in a label graph generated from the image description 504, as described above. The graph matching system 102 then generates the ground-truth semantic scene graph based on the one-to-one correspondences between the nodes, resulting in entity classes for entities in the digital image 502 and predicate classes for relationships between the entities based on the information in the image description 504.

After generating the ground-truth semantic scene graph 506, the graph matching system 102 utilizes the scene graph generation neural network 500 to generate a predicted semantic scene graph 508 for the digital image 502. Specifically, the scene graph generation neural network 500 processes the digital image to predict object classes and predicate classes for entities in the digital image 502. The graph matching system 102 then determines a scene graph generation loss 510 for the predicted semantic scene graph 508. In particular, the graph matching system 102 determines the scene graph generation loss 510 by comparing the predicted semantic scene graph 508 to the ground-truth semantic scene graph 506. In some embodiments, the graph matching system 102 utilizes a cross-entropy loss $L_{sgg}$ as the scene graph generation loss 510 by comparing the predicted object classes and predicate classes in the predicted semantic scene graph 508 to the object classes and predicate classes included in the ground-truth semantic scene graph 506.

In one or more embodiments, the graph matching system 102 then utilizes the scene graph generation loss 510 to modify the scene graph generation neural network 500. For instance, the graph matching system 102 updates parameters of the scene graph generation neural network 500 to reduce the scene graph generation loss 510 (e.g., by reducing distances between the object/predicate classes in the ground-truth semantic scene graph 506 and the predicted object/predicate classes in the predicted semantic scene graph 508). In at least some embodiments, the total loss for the graph matching system 102 and the scene graph generation neural network 500 is $L=L_{gm}+L_{sgg}$, which includes the contrastive loss for the weakly-supervised graph matching process and the scene graph generation loss.

Experimenters have conducted one or more evaluations (hereinafter, "the evaluation") of embodiments of the graph matching system 102 relative to existing systems for generating semantic scene graphs for a dataset of images with scene graph annotations. Specifically, experimenters evaluated different label preprocessing strategies for a set of frequent object categories and predicate types. Experimenters identified differences in an instance-level recall, an object-level recall, and a predicate-level recall as metrics to measure the performance of the graph matching process. For example, instance-level recall ($R_{inst}$) indicates that a bounding region is correctly matched if the bounding region is matched with the correct node in the label graph and is correctly located (i.e., has more than 50% intersection-over-union ("IoU") with the ground-truth bounding region). The evaluation determined the instance-level recall as the ratio of the correctly matched bounding regions to all of the ground-truth bounding boxes for each image, and the overall recall is averaged across all images. Additionally, object-level recall ($R_{obj}$) indicates that a bounding region is correctly matched if the bounding region is assigned with the correct object category and is correctly located. The evaluation determined the object-level recall similar to the instance-level recall, though $R_{obj}$ provides a looser measurement than $R_{inst}$, because although a bounding region may be assigned the correct category, the bounding region may be matched to the wrong node instance in the same object category in the label graph. Furthermore, the predicate-level recall ($R_{pred}$) indicates a correctly matched predicate if its subject and object bounding regions are correctly matched in the instance-level.

Additionally, the evaluation utilized (1) predicate classification ("PredCls"), (2) scene graph classification ("SGCls"), (3) scene graph detection ("SGGEN"), and (4) phrase detection ("PhrDet"). For predicate classification, given ground-truth object bounding regions and object labels, experimenters utilized the evaluated systems to predict relationship types of object pairs. For scene graph classification, given ground-truth bounding regions, the evaluated systems predicted object categories and relationship types. For scene graph detection, given an image, the evaluated systems predicted the bounding regions, categories of region proposals, and relation types of object pairs. A correctly detected entity was determined if the labels of the subject-relation-object triplet were correctly classified, and the bounding regions of subject and object had more than 50% IoU with the ground-truth. Also, for phrase detection, given an image, experimenters utilized the evaluated systems to predict the relationship triplet with a union bounding region enclosing both the object and subject. A correctly detected phrase was indicated if the labels of the triplet were correct and the union region match with the ground-truth union region with IoU greater than 0.5. Additionally, the evaluation computed the recall of the above metrics for each image and then averages over the dataset, leading to recall at K metrics (K–[20, 50, 100]). Moreover, in the triplet ranking process, the evaluation applied a constraint that the same object pair cannot predict multiple predicates in the default setting. Without such constraint, no graph constraint recall at K was indicated.

During the evaluation, the evaluated systems extracted the top 20 region proposals for each image from a region of interest pooling feature pretrained on an image dataset. Additionally, the implementation utilized GloVe embeddings, as mentioned above, to represent the object and predicate features in the label graph. Additionally, in at least one experimental embodiment, the graph matching system 102 utilized the graph neural network implementation of the embedding model with a message passing iteration of 1 when used as a scene graph generation model. Furthermore, the graph matching system 102 trained the weakly-supervised graph matching model and scene graph generation neural network together, while the $L_{sgg}$ loss was subject to a linear warmup for 12 k iterations. Also, $\lambda=0.1$ according to grid search, and the implementation assigned a discount weight of 0.1 for background objects and 0.01 for background relations for the $L_{sgg}$ due to data balance. The implementation also utilized stochastic gradient descent with a learning rate of 0.002 and momentum 0.9, and a batch size of 32.

The evaluation compared the results several different methods of the weakly-supervised scene graph generation process. In particular, the evaluation compared the graph matching system 102 with existing systems. For example, Table 1 below illustrates recall metrics for an experimental embodiment of the graph matching system 102 ("System 102") and "VSPNet," which is described by Alireza Zareian, Svebor Karaman, and Shih-Fu Chang in "Weakly supervised visual semantic parsing" in *Proceedings of the IEEE/CVF Conference on Computer Vision and Pattern Recognition*, pages 3736-3745 (2020), which utilizes second-order graph matching.

Additionally, the evaluation determined the effect of the graph matching system 102 on the scene graph generation neural network training task. For example, the evaluation utilizes a scene graph generation neural network trained with semantic scene graphs generated by according to different methods. Specifically, Table 2 below illustrates a comparison of VSPNet and the graph matching system 102 ("WSGM") with Iterative Message Passing ("IMP"), Neural Motif ("MOTIF"), and the graph neural network architecture described previously ("EAMP"). IMP is described by Danfei Xu, Yuke Zhu, Christopher B. Choy, and Li Fei-Fei in "Scene graph generation by iterative message passing" in *Proceedings of the IEEE conference on computer vision and pattern recognition*, pages 5410-5419 (2017). MOTIF is described by Rowan Zellers, Mark Yatskar, Sam Thomson, and Yejin Choi in "Neural motifs: Scene graph parsing with global context" in *Proceedings of the IEEE conference on computer vision and pattern recognition*, pages 5831-5840 (2018). As IMP and MOTIF require the input feature of the union of a bounding region pair, which is unavailable in the

| Method | SGGen | | | SGCls | | | PredCls | |
|---|---|---|---|---|---|---|---|---|
| | $R_{inst}$ | $R_{obj}$ | $R_{pred}$ | $R_{inst}$ | $R_{obj}$ | $R_{pred}$ | $R_{inst}$ | $R_{pred}$ |
| Upper Bound | 39.65 | 39.65 | 27.32 | 100.00 | 100.00 | 100.00 | 100.00 | 100.00 |
| VSPNet | 2.75 | 4.50 | 0.78 | 59.89 | 71.86 | 50.31 | 70.94 | 63.54 |
| System 102 | 9.07 | 13.15 | 1.87 | 67.61 | 77.93 | 58.99 | 74.22 | 68.83 |

While second-order graph matching provides predicate predictions, the graph matching system 102 improved the graph matching performance. As indicated above, the graph matching system 102 provides improvement over the VSPNet performance. Additionally, the upper bound graph matching recall for SGGen is 39.65% for instance recall and 27.32% for predicate recall, which limits the matching performance, indicating a large semantic gap to the dataset.

evaluation setting, the evaluation replaced it with the concatenation of the subject and object feature followed by a fully connected layer. Additionally, the evaluation disabled the object label feature in the input for MOTIF with no object detector. The frequency prior was applied by default for all models as in MOTIF. Table 2 and Table 3 show the performance of the example embodiment of the scene graph generation neural network with and without scene graph constraint, respectively.

| Method | Supervision | SGGen | | | SGCls | | | PredCls | | |
|---|---|---|---|---|---|---|---|---|---|---|
| | | 20 | 50 | 100 | 20 | 50 | 100 | 20 | 50 | 100 |
| MOTIF | Full | 25.48 | 32.78 | 37.16 | 35.63 | 38.92 | 39.77 | 58.46 | 65.18 | 67.01 |
| VSPNet | Weak | — | 4.01 | 4.17 | — | 23.43 | 23.50 | — | 44.59 | 44.77 |
| WSGM + IMP | | 3.87 | 5.06 | 5.73 | 25.09 | 30.04 | 31.85 | 48.22 | 61.37 | 65.83 |
| WSGM + MOTIF | | 4.12 | 5.59 | 6.45 | 23.54 | 29.16 | 31.39 | 44.10 | 59.07 | 64.60 |
| WSGM + EAMP | | 4.19 | 5.43 | 6.02 | 25.32 | 30.38 | 32.10 | 46.57 | 59.19 | 64.22 |
| Best Improvement | | — | 35% | 44% | — | 30% | 37% | — | 38% | 47% |
| MOTIF | Full | 27.04 | 36.58 | 43.43 | 40.58 | 48.48 | 51.98 | 66.39 | 81.02 | 88.24 |
| VSPNet | Weak | — | 4.70 | 5.40 | — | 30.50 | 32.70 | — | 57.70 | 62.40 |
| WSGM + IMP | | 3.91 | 5.26 | 6.31 | 27.03 | 34.57 | 38.89 | 51.13 | 69.57 | 80.19 |
| WSGM + MOTIF | | 4.16 | 5.74 | 6.94 | 25.17 | 33.12 | 37.85 | 46.76 | 66.86 | 78.46 |
| WSGM + EAMP | | 4.25 | 5.70 | 6.70 | 27.40 | 35.09 | 39.43 | 49.60 | 67.12 | 77.74 |
| Best Improvement | | — | 21% | 24% | — | 15% | 21% | — | 21% | 29% |

As shown, VSPNet does not strictly satisfy the scene graph constraint, so the evaluation maintains the top predicate for VSPNet from a unique object-subject pair. The evaluation also compared the original number from VSPNet in Table 3. For all models, the graph matching system 102 (i.e., WSGM) outperforms VSPNet (e.g., SGGen R @ 100: 54% relative improvement, SGCls R @ 100 37% relative improvement) and have comparable performance across the different methods.

Table 4 below illustrates the results of an ablation study for different constructions of contrast in the contrastive learning setting of SGGen. Specifically, the evaluation noted three different constructions of the contrast. The first case represented as $L_{gm}^{vis} = \sum(i,j) \in J^*, i \neq i', j \neq j' \max(0, s_{i'j} - s_{ij} + \Delta)$ in which the anchor was the label node and the positive and negative samples were the visual nodes. Alternatively, if the visual node was the anchor and the label nodes construct the contrast, the loss becomes $L_{gm}^{lbl} = \sum(i,j) \in J^*, j \neq j' \max(0, s_{ij'} - s_{ij} + \Delta)$. The combination of both directions is $L_{gm}^{comb} = L_{gm}^{vis} + L_{gm}^{lbl}$.

| Rate | R@20 | R@50 | R@100 | $R_{inst}$ |
| --- | --- | --- | --- | --- |
| $L_{gm}^{vis}$ | 4.19 | 5.43 | 6.02 | 10.12 |
| $L_{gm}^{lbl}$ | 3.61 | 4.79 | 5.43 | 9.71 |
| $L_{gm}^{comb}$ | 3.77 | 4.84 | 5.39 | 9.33 |

As shown, the contrast in visual nodes provides improved performance over contrast for the label nodes or combination.

Furthermore, the evaluation compared the triplet loss against two other common contrastive losses for determining a graph matching loss: logistic loss and noise contrastive estimation ("NCE") loss. In the triplet loss and logistic loss, the same number of negative proposals are randomly sampled as the matched proposals. The logistic loss can be represented as $-\sum(i,j) \in J^*, i \neq i', j \neq j' (\log(\sigma(s_{ij})) + \log(\sigma(-S_{i'j'})))$, where $\sigma(\cdot)$ represents a sigmoid function. The contrastive loss takes all negative proposals in the images on the denominator, which is given as:

$$\sum_j -\log \frac{\exp(s_{ij})}{\sum_{i'} \exp(s_{i'j})}$$

Table 5 below illustrates an ablation study of the different losses in the setting of SGGen.

| Loss | R@20 | R@50 | R@100 | $R_{inst}$ |
| --- | --- | --- | --- | --- |
| Logistic | 1.23 | 1.73 | 2.01 | 2.33 |
| NCE | 1.21 | 1.80 | 2.17 | 2.46 |
| Triplet | 2.84 | 3.95 | 4.56 | 8.77 |

As shown, the triplet loss performed better than the other losses for the graph matching process.

Table 6 below illustrates an ablation study of the graph matching system 102 utilizing an embedding model with a graph neural network ("EAMP") replacing a multilayer perceptron, as described above, with different numbers of message passing iterations. EAMP with 0 iterations reduces the embedding model to a multilayer perceptron.

| Method | SGGen | | | SGCls | | | PredCls | |
| --- | --- | --- | --- | --- | --- | --- | --- | --- |
| | $R_{inst}$ | $R_{obj}$ | $R_{pred}$ | $R_{inst}$ | $R_{obj}$ | $R_{pred}$ | $R_{inst}$ | $R_{pred}$ |
| Iter 0 | 9.07 | 13.15 | 1.87 | 67.61 | 77.93 | 58.99 | 74.22 | 68.83 |
| Iter 1 | 8.39 | 12.18 | 1.63 | 64.39 | 80.00 | 53.64 | 74.36 | 69.05 |
| Iter 2 | 7.19 | 10.75 | 1.00 | 63.31 | 78.97 | 53.00 | 74.51 | 69.50 |

As shown, the multilayer perceptron ("Iter 0") produces the best results. For SGCls and PredCls, more iterations of message passing can improve the results.

Table 7 below illustrates a comparison of the first-order graph matching process ("FOMP") with an ungrounded label graph to a grounded setting.

| | R@20 | R@50 | R@100 | $R_{inst}$ |
| --- | --- | --- | --- | --- |
| Grounded | 3.26 | 4.07 | 4.48 | 6.57 |
| FOMP | 4.19 | 5.43 | 6.02 | 10.12 |
| Sub-graph 10% | 3.51 | 4.40 | 4.79 | 9.13 |
| Sub-graph 50% | 4.20 | 5.29 | 5.81 | 9.81 |

Additionally, Table 7 illustrates comparisons with the original scene graph cut into sub-graphs (at 10% and 50% of nodes remaining). Fewer nodes resulted in decreased performance, indicating that the one-to-one mapping constraint is more important to improved performance than errors due to mismatch propagation.

Furthermore, Table 8 illustrates results of an ablation study based on selection of negative samples. Specifically, "CrossMatch" indicates that negative objects can be obtained from other images, and "HardNeg" indicates that negative objects must be matched by other nodes. Without HardNeg, a negative sample can be any unmatched object of current label nodes.

| Loss | R@20 | R@50 | R@100 | $R_{inst}$ |
| --- | --- | --- | --- | --- |
| Full | 4.19 | 5.43 | 6.02 | 10.12 |
| W/o CrossMatch | 2.84 | 3.95 | 4.56 | 8.14 |
| W/o HardNeg | 3.63 | 4.74 | 5.31 | 8.48 |

Accordingly, as illustrated, CrossMatch provides significant improvement by providing additional negative samples, which leads to better contrast for learning. Additionally, HardNeg ensures that visual nodes matched by other label nodes have better semantic meaning than the background object(s), such that semantic differences of other objects from current label nodes assist the graph matching system 102.

Figure 6:
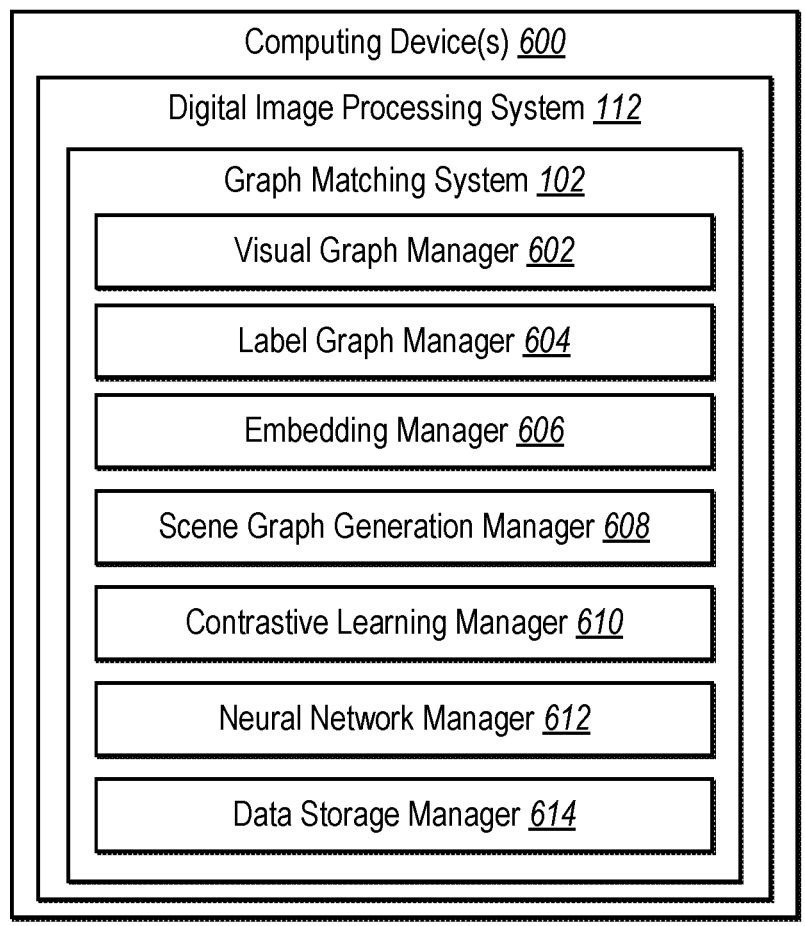
FIG. 6 illustrates a diagram of the graph matching system of FIG. 1 in accordance with one or more implementations.

FIG. 6 illustrates a detailed schematic diagram of an embodiment of the graph matching system 102 described above. As shown, the graph matching system 102 is implemented in a digital image processing system 112 on computing device(s) 600 (e.g., a client device and/or server device as described in FIG. 1, and as further described below in relation to FIG. 8). Additionally, in one or more embodiments, the graph matching system 102 includes, but is not limited to, a visual graph manager 602, a label graph manager 604, an embedding manager 606, a scene graph generation manager 608, a contrastive learning manager 610, a neural network manager 612, and a data storage manager 614. The graph matching system 102 can be implemented on any number of computing devices. In one or more embodiments, the graph matching system 102 is implemented in a distributed system of server devices for digital image processing. In alternative embodiments, the graph matching system 102 is implemented within one or more additional systems. Alternatively, the graph matching system 102 may be implemented on a single computing device such as a single client device.

In one or more embodiments, each of the components of the graph matching system 102 is in communication with other components using any suitable communication technologies. Additionally, in some embodiments, the components of the graph matching system 102 are in communication with one or more other devices including other computing devices of a user, server devices (e.g., cloud storage devices), licensing servers, or other devices/systems. It will be recognized that although the components of the graph matching system 102 are shown to be separate in FIG. 6, any of the subcomponents may be combined into fewer components, such as into a single component, or divided into more components as may serve a particular implementation. Furthermore, although the components of FIG. 6 are described in connection with the graph matching system 102, in one or more embodiments, at least some of the components for performing operations in conjunction with the graph matching system 102 described herein are implemented on other devices within the environment.

In some embodiments, the components of the graph matching system 102 include software, hardware, or both. For example, the components of the graph matching system 102 include one or more instructions stored on a computer-readable storage medium and executable by processors of one or more computing devices (e.g., the computing device(s) 600). When executed by the one or more processors, the computer-executable instructions of the graph matching system 102 can cause the computing device(s) 600 to perform the operations described herein. Alternatively, the components of the graph matching system 102 can include hardware, such as a special purpose processing device to perform a certain function or group of functions. Additionally, or alternatively, the components of the graph matching system 102 can include a combination of computer-executable instructions and hardware.

Furthermore, the components of the graph matching system 102 performing the functions described herein with respect to the graph matching system 102 may, for example, be implemented as part of a stand-alone application, as a module of an application, as a plug-in for applications, as a library function or functions that may be called by other applications, and/or as a cloud-computing model. Thus, the components of the graph matching system 102 may be implemented as part of a stand-alone application on a personal computing device or a mobile device. Alternatively, or additionally, the components of the graph matching system 102 may be implemented in any application that provides digital image modification, including, but not limited to ADOBE® PHOTOSHOP®, ADOBE® CREATIVE CLOUD®, and ADOBE® DOCUMENT CLOUD® software. "ADOBE," "PHOTOSHOP," "CREATIVE CLOUD," and "DOCUMENT CLOUD" are either registered trademarks or trademarks of Adobe Inc. in the United States and/or other countries.

In one or more embodiments, the visual graph manager 602 provides management of visual graphs for digital images. In particular, the visual graph manager 602 generates visual graphs from digital images by identifying entity bounding regions in the digital images and constructing the visual graphs to include a plurality of nodes corresponding to the entity bounding regions. Alternatively, the visual graph manager 602 obtains visual graphs generated for digital images by one or more other systems (e.g., a third-party object detection system).

According to one or more embodiments, the label graph manager 604 provides management of label graphs for digital images. For example, the label graph manager 604 extracts ungrounded label graphs for digital images by utilizing a natural language parsing model to parse descriptions of the digital images. To illustrate, the label graph manager 604 parses captions of digital images to determine entity labels and entity relationships for entities in the digital images. Additionally, the label graph manager 604 generates the label graphs to include a plurality of entity nodes connected by edges based on the parsed information.

In one or more embodiments, the embedding manager 606 utilizes embedding models to generate embeddings for visual graphs and label graphs. Specifically, the embedding manager 606 utilizes a visual embedding model to generate visual graph embeddings from nodes in visual graphs. Additionally, the embedding manager 606 utilizes a label embedding model to generate label graph embeddings from nodes in label graphs.

Additionally, in one or more embodiments, the scene graph generation manager 608 manages the generation of semantic scene graphs for digital images. In particular, the scene graph generation manager 608 communicates with the embedding manager 606 to obtain embeddings generated from visual graphs and label graphs. The scene graph generation manager 608 also compares visual graph embeddings with label graph embeddings to generate similarity metrics (e.g., cosine similarity metrics). The scene graph generation manager 608 also utilizes a graph matching algorithm (e.g., the Hungarian algorithm) to generate semantic scene graphs from embeddings based on similarity metrics.

In additional embodiments, the contrastive learning manager 610 utilizes a contrastive learning model to train embedding models associated with the embedding manager 606. For instance, the contrastive learning manager 610 determines positive and negative samples for comparing to embeddings. The contrastive learning manager 610 also utilizes a contrastive loss based on distances between the embeddings and the respective positive and negative samples to enforce similarity with the positive samples and impose greater distances with the negative samples (e.g., by modifying the parameters of one or more of the embedding models).

Furthermore, in one or more embodiments, the neural network manager 612 manages a scene graph generation neural network for generating semantic scene graphs from digital images. Additionally, the neural network manager 612 manages training of the scene graph generation neural network based on semantic scene graphs generated via the scene graph generation manager 608. In particular, the neural network manager 612 utilizes semantic scene graphs generated by the scene graph generation manager 608 as ground-truth semantic scene graphs for comparing to predicted semantic scene graphs generated by the scene graph generation neural network.

The graph matching system 102 also includes a data storage manager 614 (that comprises a non-transitory computer memory/one or more memory devices) that stores and maintains data associated with generating semantic scene graphs via a graph matching process and training scene graph generation neural networks. For example, the data storage manager 614 stores data associated with generating a semantic scene graph including visual graphs, label graphs, visual graph embeddings, label graph embeddings, similarity metrics, and entity nodes and relationships edges of semantic scene graphs. The data storage manager 614 also stores information associated with training embedding models and scene graph generation neural networks including contrastive losses and scene graph generation losses.

Figure 7:
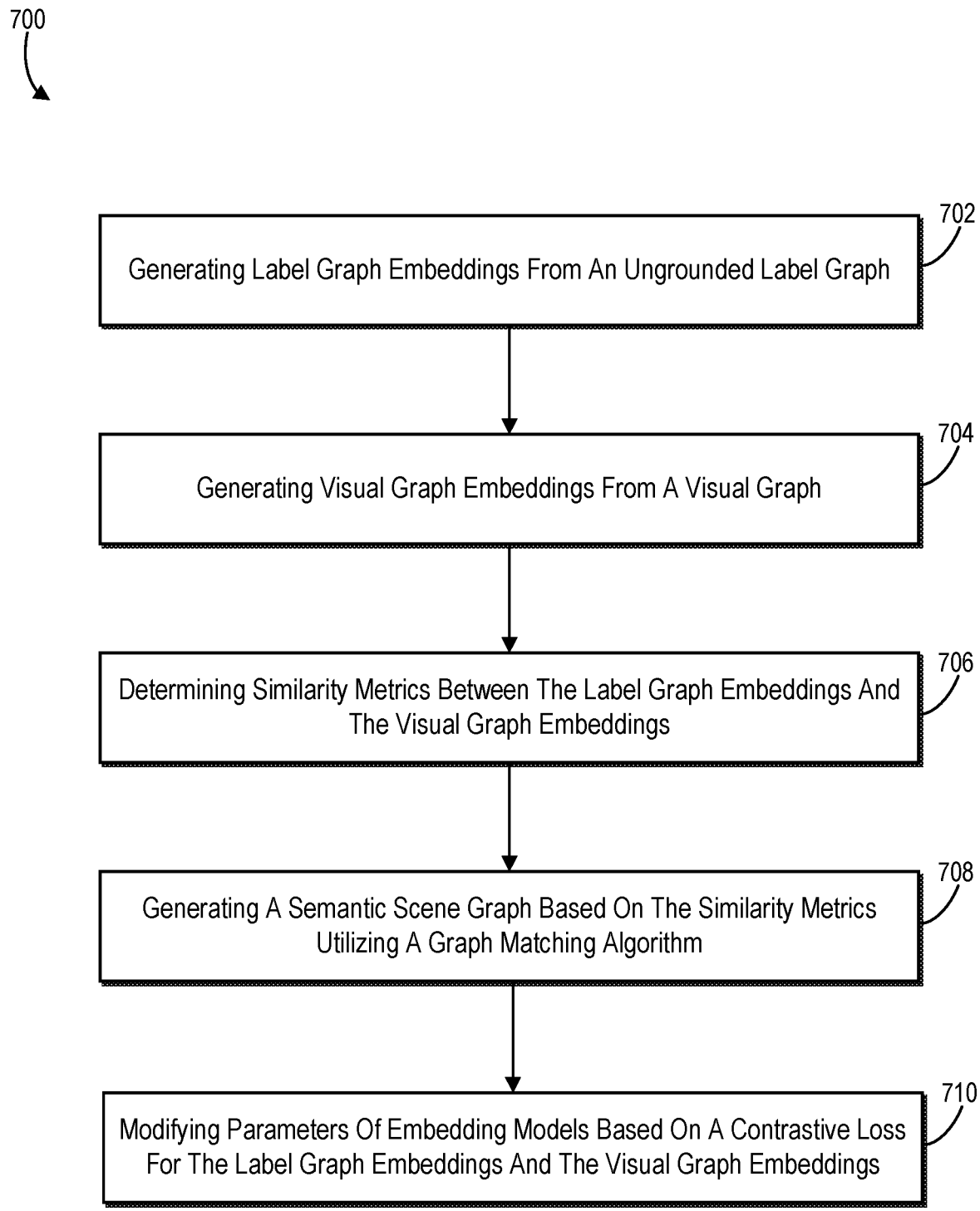
FIG. 7 illustrates a flowchart of a series of acts for utilizing a weakly-supervised graph matching network to align an ungrounded label graph and a visual graph for scene graph generation in accordance with one or more implementations.

Turning now to FIG. 7, this figure shows a flowchart of a series of acts 700 of generating semantic scene graphs via a weakly-supervised graph matching process. While FIG. 7 illustrates acts according to one embodiment, alternative embodiments may omit, add to, reorder, and/or modify any of the acts shown in FIG. 7. The acts of FIG. 7 can be performed as part of a method. Alternatively, a non-transitory computer readable medium can comprise instructions, that when executed by one or more processors, cause a computing device to perform the acts of FIG. 7. In still further embodiments, a system can perform the acts of FIG. 7.

As shown, the series of acts 700 includes an act 702 of generating label graph embeddings from an ungrounded label graph. For example, act 702 involves generating label graph embeddings from connected entity labels in an ungrounded label graph corresponding to a digital image. Act 702 can involve encoding features from an entity label of the ungrounded label graph into a label graph embedding utilizing a label embedding model. For example, the label embedding model comprises a multilayer perceptron network. Alternatively, the label embedding model comprises a graph neural network. Accordingly, act 702 can involve encoding, utilizing the graph neural network, information from an entity label and relationship information associated with one or more entity relationships involving the entity label into a label graph embedding according to one or more confidence scores for the one or more entity relationships.

Act 702 can involve extracting the ungrounded label graph from a natural language description of the digital image utilizing a natural language parsing model. To illustrate, the natural language description can include a caption for the digital image.

The series of acts 700 also includes an act 704 of generating visual graph embeddings from a visual graph. For example, act 704 involves generating visual graph embeddings from entity bounding regions in a visual graph corresponding to the digital image. Act 704 can involve encoding features from an entity bounding region into a visual graph embedding utilizing a visual embedding model.

Additionally, the series of acts 700 includes an act 706 of determining similarity metrics between the label graph embeddings and the visual graph embeddings. For example, act 706 involves determining a cosine similarity metric between a label graph embedding corresponding to an entity label of the ungrounded label graph and a visual graph embedding corresponding to an entity bounding region of the visual graph. Act 706 can involve determining the similarity metrics between pairs of the label graph embeddings and the visual graph embeddings.

Furthermore, the series of acts 700 includes an act 708 of generating a semantic scene graph based on the similarity metrics utilizing a graph matching algorithm. For example, act 708 involves generating, utilizing a graph matching algorithm, a semantic scene graph comprising entity nodes connected via a plurality of relationship edges based on the similarity metrics between the label graph embeddings and the visual graph embeddings. Act 708 can involve generating, utilizing a first-order graph matching algorithm, a bijective mapping between the label graph embeddings and the visual graph embeddings based on the similarity metrics. For example, act 708 can involve determining one-to-one correspondences between the label graph embeddings and the visual graph embeddings based on the similarity metrics. Act 708 can then involve generating the semantic scene graph based on the bijective mapping and edges indicating relationships corresponding to the connected entity labels in the ungrounded label graph. To illustrate, act 708 can involve aligning the ungrounded label graph and the visual graph according to the one-to-one correspondences.

The series of acts 700 also includes an act 710 of modifying parameters of embedding models based on a contrastive loss for the label graph embeddings and the visual graph embeddings. For example, act 710 involves modifying parameters of the label embedding model or the visual embedding model based on the contrastive loss. Act 710 can involve determining the contrastive loss by comparing label graph embeddings from the ungrounded label graph to positive visual graph embeddings corresponding to positive entity bounding regions of the visual graph.

Act 710 can involve determining a first distance between a selected label graph embedding of the label graph embeddings and a positive visual graph embedding of the visual graph embeddings. Act 710 can then involve determining a second distance between the selected label graph embedding and a negative visual graph embedding of the visual graph embeddings. In particular, act 710 can involve determining first distances between the label graph embeddings and corresponding positive visual graph embeddings of the visual graph embeddings, and determining second distances between the label graph embeddings and negative visual graph embeddings of the visual graph embeddings. Additionally, act 710 or another act can involve generating a contrastive loss based on the first distance and the second distance. Act 710 can then involve modifying parameters of the label embedding model or the visual embedding model to reduce the first distance between the selected label graph embedding and the positive visual graph embedding and increase the second distance between the selected label graph embedding and the negative visual graph embedding.

Act 710 can involve determining the negative visual graph embedding from an unmatched entity bounding region in the digital image relative to an entity label of the ungrounded label graph. Act 710 can also involve selecting an additional negative visual graph embedding from an additional digital image associated with the digital image, wherein the digital image and the additional digital image are video frames of a digital video.

In one or more embodiments, the series of acts 700 also include modifying parameters of a scene graph generation neural network based on an additional semantic scene graph generated for the digital image utilizing the scene graph generation neural network and the semantic scene graph. For example, the series of acts 700 can include determining a scene graph generation loss based on the digital image and the semantic scene graph generated by the graph matching algorithm and the additional semantic scene graph generated by the scene graph generation neural network. For instance, the series of acts 700 generates the scene graph generation loss based on differences between objects and predicates of the semantic scene graph generated by the graph matching algorithm and objects and predicates of the additional semantic scene graph generated by the scene graph generation neural network. The series of acts 700 can also include modifying parameters of the scene graph generation neural network based on the scene graph generation loss.

Embodiments of the present disclosure may comprise or utilize a special purpose or general-purpose computer including computer hardware, such as, for example, one or more processors and system memory, as discussed in greater detail below. Embodiments within the scope of the present disclosure also include physical and other computer-readable media for carrying or storing computer-executable instructions and/or data structures. In particular, one or more of the processes described herein may be implemented at least in part as instructions embodied in a non-transitory computer-readable medium and executable by one or more computing devices (e.g., any of the media content access devices described herein). In general, a processor (e.g., a microprocessor) receives instructions, from a non-transitory computer-readable medium, (e.g., a memory, etc.), and executes those instructions, thereby performing one or more processes, including one or more of the processes described herein.

Computer-readable media can be any available media that can be accessed by a general purpose or special purpose computer system. Computer-readable media that store computer-executable instructions are non-transitory computer-readable storage media (devices). Computer-readable media that carry computer-executable instructions are transmission media. Thus, by way of example, and not limitation, embodiments of the disclosure can comprise at least two distinctly different kinds of computer-readable media: non-transitory computer-readable storage media (devices) and transmission media.

Non-transitory computer-readable storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to non-transitory computer-readable storage media (devices) (or vice versa). For example, computer-executable instructions or data structures received over a network or data link can be buffered in RAM within a network interface module (e.g., a "NIC"), and then eventually transferred to computer system RAM and/or to less volatile computer storage media (devices) at a computer system. Thus, it should be understood that non-transitory computer-readable storage media (devices) can be included in computer system components that also (or even primarily) utilize transmission media.

Computer-executable instructions comprise, for example, instructions and data which, when executed at a processor, cause a general-purpose computer, special purpose computer, or special purpose processing device to perform a certain function or group of functions. In some embodiments, computer-executable instructions are executed on a general-purpose computer to turn the general-purpose computer into a special purpose computer implementing elements of the disclosure. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the disclosure may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like. The disclosure may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Embodiments of the present disclosure can also be implemented in cloud computing environments. In this description, "cloud computing" is defined as a model for enabling on-demand network access to a shared pool of configurable computing resources. For example, cloud computing can be employed in the marketplace to offer ubiquitous and convenient on-demand access to the shared pool of configurable computing resources. The shared pool of configurable computing resources can be rapidly provisioned via virtualization and released with low management effort or service provider interaction, and then scaled accordingly.

A cloud-computing model can be composed of various characteristics such as, for example, on-demand self-service, broad network access, resource pooling, rapid elasticity, measured service, and so forth. A cloud-computing model can also expose various service models, such as, for example, Software as a Service ("SaaS"), Platform as a Service ("PaaS"), and Infrastructure as a Service ("IaaS"). A cloud-computing model can also be deployed using different deployment models such as private cloud, community cloud, public cloud, hybrid cloud, and so forth. In this description and in the claims, a "cloud-computing environment" is an environment in which cloud computing is employed.

Figure 8:
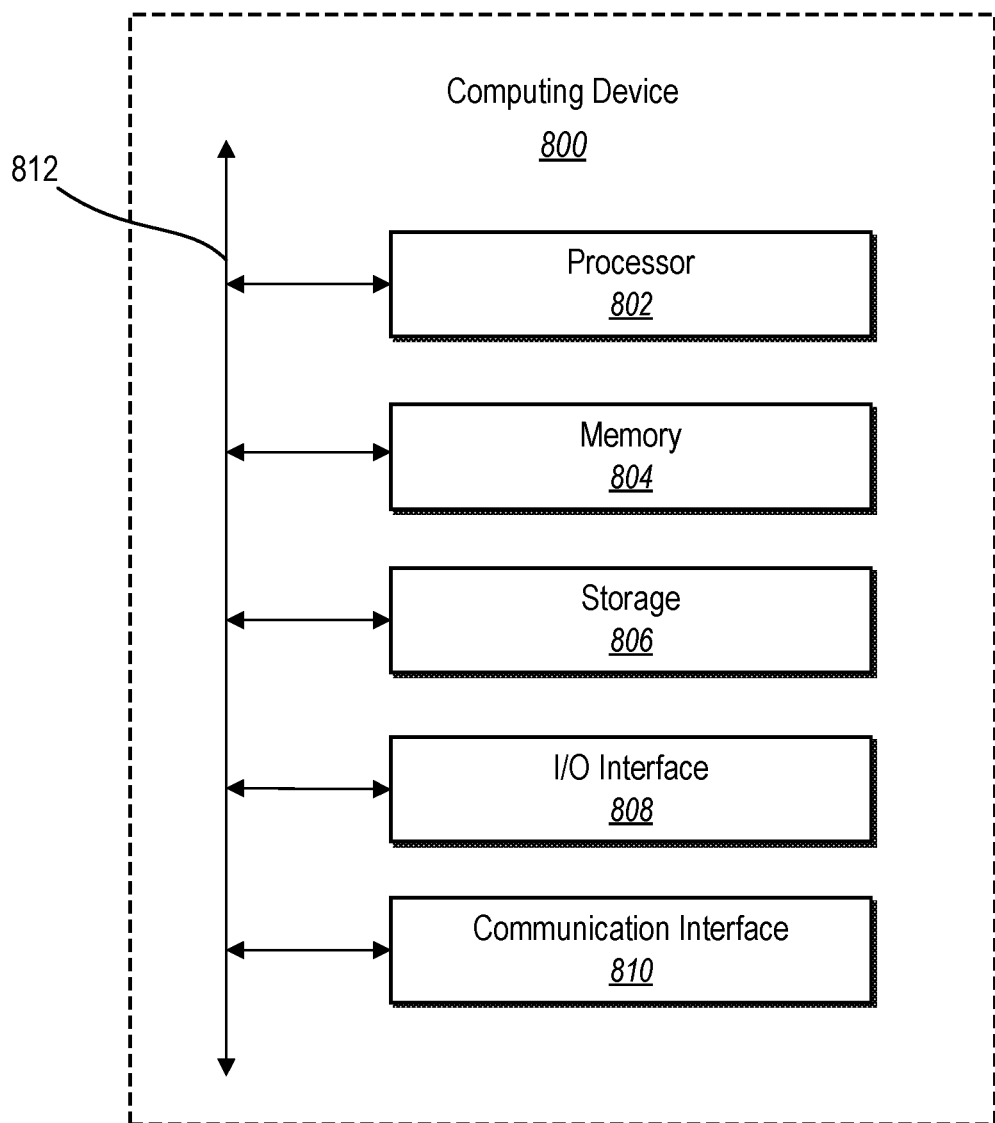
FIG. 8 illustrates a block diagram of an exemplary computing device in accordance with one or more embodiments.

FIG. 8 illustrates a block diagram of exemplary computing device 800 that may be configured to perform one or more of the processes described above. One will appreciate that one or more computing devices such as the computing device 800 may implement the system(s) of FIG. 1. As shown by FIG. 8, the computing device 800 can comprise a processor 802, a memory 804, a storage device 806, an I/O interface 808, and a communication interface 810, which may be communicatively coupled by way of a communication infrastructure 812. In certain embodiments, the computing device 800 can include fewer or more components than those shown in FIG. 8. Components of the computing device 800 shown in FIG. 8 will now be described in additional detail.

In one or more embodiments, the processor 802 includes hardware for executing instructions, such as those making up a computer program. As an example, and not by way of limitation, to execute instructions for dynamically modifying workflows, the processor 802 may retrieve (or fetch) the instructions from an internal register, an internal cache, the memory 804, or the storage device 806 and decode and execute them. The memory 804 may be a volatile or non-volatile memory used for storing data, metadata, and programs for execution by the processor(s). The storage device 806 includes storage, such as a hard disk, flash disk drive, or other digital storage device, for storing data or instructions for performing the methods described herein.

The I/O interface 808 allows a user to provide input to, receive output from, and otherwise transfer data to and receive data from computing device 800. The I/O interface 808 may include a mouse, a keypad or a keyboard, a touch screen, a camera, an optical scanner, network interface, modem, other known I/O devices or a combination of such I/O interfaces. The I/O interface 808 may include one or more devices for presenting output to a user, including, but not limited to, a graphics engine, a display (e.g., a display screen), one or more output drivers (e.g., display drivers), one or more audio speakers, and one or more audio drivers. In certain embodiments, the I/O interface 808 is configured to provide graphical data to a display for presentation to a user. The graphical data may be representative of one or more graphical user interfaces and/or any other graphical content as may serve a particular implementation.

The communication interface 810 can include hardware, software, or both. In any event, the communication interface 810 can provide one or more interfaces for communication (such as, for example, packet-based communication) between the computing device 800 and one or more other computing devices or networks. As an example, and not by way of limitation, the communication interface 810 may include a network interface controller (NIC) or network adapter for communicating with an Ethernet or other wire-based network or a wireless NIC (WNIC) or wireless adapter for communicating with a wireless network, such as a WI-FI.

Additionally, the communication interface 810 may facilitate communications with various types of wired or wireless networks. The communication interface 810 may also facilitate communications using various communication protocols. The communication infrastructure 812 may also include hardware, software, or both that couples components of the computing device 800 to each other. For example, the communication interface 810 may use one or more networks and/or protocols to enable a plurality of computing devices connected by a particular infrastructure to communicate with each other to perform one or more aspects of the processes described herein. To illustrate, the digital content campaign management process can allow a plurality of devices (e.g., a client device and server devices) to exchange information using various communication networks and protocols for sharing information such as electronic messages, user interaction information, engagement metrics, or campaign management resources.

In the foregoing specification, the present disclosure has been described with reference to specific exemplary embodiments thereof. Various embodiments and aspects of the present disclosure(s) are described with reference to details discussed herein, and the accompanying drawings illustrate the various embodiments. The description above and drawings are illustrative of the disclosure and are not to be construed as limiting the disclosure. Numerous specific details are described to provide a thorough understanding of various embodiments of the present disclosure.

The present disclosure may be embodied in other specific forms without departing from its spirit or essential characteristics. The described embodiments are to be considered in all respects only as illustrative and not restrictive. For example, the methods described herein may be performed with less or more steps/acts or the steps/acts may be performed in differing orders. Additionally, the steps/acts described herein may be repeated or performed in parallel with one another or in parallel with different instances of the same or similar steps/acts. The scope of the present application is, therefore, indicated by the appended claims rather than by the foregoing description. All changes that come within the meaning and range of equivalency of the claims are to be embraced within their scope.

What is claimed is:

1. A computer-implemented method comprising:
generating, by at least one processor, label graph embeddings from connected entity labels in an ungrounded label graph corresponding to a digital image, the ungrounded label graph comprising a connected set of nodes corresponding to entities in the digital image without positional information associated with the entities;
generating, by the at least one processor, visual graph embeddings from entity bounding regions in a visual graph corresponding to the digital image, the visual graph comprising a set of nodes corresponding to positions of the entities in the digital image;
determining, by the at least one processor, similarity metrics between the label graph embeddings and the visual graph embeddings; and
generating, utilizing a first-order graph matching algorithm, a semantic scene graph comprising entity nodes connected via a plurality of relationship edges based on the similarity metrics between the label graph embeddings and the visual graph embeddings.

2. The computer-implemented method as recited in claim 1, further comprising extracting the ungrounded label graph from a natural language description of the digital image utilizing a natural language parsing model.

3. The computer-implemented method as recited in claim 1, wherein determining the similarity metrics comprises determining a cosine similarity metric between a label graph embedding corresponding to an entity label of the ungrounded label graph and a visual graph embedding corresponding to an entity bounding region of the visual graph.

4. The computer-implemented method as recited in claim 1, wherein generating the semantic scene graph comprises:
generating, utilizing the first-order graph matching algorithm, a bijective mapping between the label graph embeddings and the visual graph embeddings based on the similarity metrics; and
generating the semantic scene graph based on the bijective mapping and edges indicating relationships corresponding to the connected entity labels in the ungrounded label graph.

5. The computer-implemented method as recited in claim 1, wherein:
generating the label graph embeddings comprises encoding features from an entity label of the ungrounded label graph into a label graph embedding utilizing a label embedding model; and generating the visual graph embeddings comprises encoding features from an entity bounding region into a visual graph embedding utilizing a visual embedding model.

6. The computer-implemented method as recited in claim 5, further comprising:
determining a first distance between a selected label graph embedding of the label graph embeddings and a positive visual graph embedding of the visual graph embeddings;
determining a second distance between the selected label graph embedding and a negative visual graph embedding of the visual graph embeddings; and
generating a contrastive loss based on the first distance and the second distance.

7. The computer-implemented method as recited in claim 6, further comprising modifying parameters of the label embedding model or the visual embedding model to reduce the first distance between the selected label graph embedding and the positive visual graph embedding and increase the second distance between the selected label graph embedding and the negative visual graph embedding.

8. The computer-implemented method as recited in claim 1, wherein:
generating the label graph embeddings comprises encoding features from an entity label of the ungrounded label graph into a label graph embedding by utilizing a label embedding model; and
generating the visual graph embeddings comprises encoding features from an entity bounding region into a visual graph embedding by utilizing a visual embedding model.

9. The computer-implemented method as recited in claim 1, further comprising:
determining a scene graph generation loss based on the digital image and the semantic scene graph generated by the first-order graph matching algorithm and an additional semantic scene graph generated by a scene graph generation neural network; and
modifying parameters of the scene graph generation neural network based on the scene graph generation loss.

10. A system comprising:
one or more memory devices comprising a digital image of a plurality of entities; and
one or more servers configured to cause the system to:
generate, utilizing a label embedding model, label graph embeddings from connected entity labels in an ungrounded label graph corresponding to the digital image, the ungrounded label graph comprising a connected set of nodes corresponding to entities in the digital image without positional information associated with the entities;
generate, utilizing a visual embedding model, visual graph embeddings from entity bounding regions in a visual graph corresponding to the digital image, the visual graph comprising a set of nodes corresponding to positions of the entities in the digital image;
generate, utilizing a graph matching algorithm, a semantic scene graph comprising entity nodes connected via a plurality of relationship edges based on similarity metrics determined for the label graph embeddings and the visual graph embeddings;
determine a contrastive loss by comparing label graph embeddings from the ungrounded label graph to positive visual graph embeddings corresponding to positive entity bounding regions of the visual graph; and
modify parameters of the label embedding model or the visual embedding model based on the contrastive loss.

11. The system as recited in claim 10, wherein the one or more servers are further configured to cause the system to generate the semantic scene graph by:
determining the similarity metrics comprising cosine similarity metrics between the label graph embeddings and the visual graph embeddings;
generating, utilizing the graph matching algorithm, a bijective mapping between the label graph embeddings and the visual graph embeddings based on the cosine similarity metrics; and
generating the semantic scene graph based on the bijective mapping and relationships corresponding to the connected entity labels in the ungrounded label graph.

12. The system as recited in claim 10, wherein the one or more servers are further configured to cause the system to:
determining first distances between the label graph embeddings and corresponding positive visual graph embeddings of the visual graph embeddings;
determining second distances between the label graph embeddings and negative visual graph embeddings of the visual graph embeddings;
generating a contrastive loss based on the first distances and the second distances; and
modifying parameters of the label embedding model and the visual embedding model based on the contrastive loss.

13. The system as recited in claim 12, wherein the one or more servers are further configured to cause the system to determine a negative visual graph embedding from an unmatched entity bounding region in the digital image relative to an entity label of the ungrounded label graph.

14. The system as recited in claim 13, wherein the one or more servers are further configured to cause the system to determine an additional negative visual graph embedding from an additional entity bounding region in an additional digital image associated with the digital image.

15. The system as recited in claim 10, wherein:
the label embedding model comprises a multilayer perceptron network; and
the one or more servers are further configured to cause the system to generate the label graph embeddings by encoding information from an entity label into a label graph embedding utilizing the multilayer perceptron network.

16. The system as recited in claim 10, wherein:
the label embedding model comprises a graph neural network; and
the one or more servers are further configured to cause the system to generate the label graph embeddings by encoding, utilizing the graph neural network, information from an entity label and relationship information associated with one or more entity relationships involving the entity label into a label graph embedding according to one or more confidence scores for the one or more entity relationships.

17. The system as recited in claim 10, wherein the one or more servers are further configured to cause the system to:
generate an additional semantic scene graph for the digital image by utilizing a scene graph generation neural network;
determine a scene graph generation loss based on differences between objects and predicates of the semantic scene graph generated by the graph matching algorithm and objects and predicates of the additional semantic scene graph generated by the scene graph generation neural network; and modifying parameters of the scene graph generation neural network based on the scene graph generation loss.

18. A non-transitory computer readable storage medium comprising instructions that, when executed by at least one processor, cause a computing device to:

generate label graph embeddings from entity labels connected via edges indicating relationships between the entity labels in an ungrounded label graph corresponding to a digital image, the ungrounded label graph comprising a connected set of nodes corresponding to entities in the digital image without positional information associated with the entities;

generate visual graph embeddings from entity bounding regions in a visual graph corresponding to the digital image, the visual graph comprising a set of nodes corresponding to positions of the entities in the digital image;

generate, utilizing a first-order graph matching algorithm, a semantic scene graph comprising entity nodes connected via a plurality of relationship edges based on similarity metrics determined for the label graph embeddings and the visual graph embeddings; and modify parameters of a scene graph generation neural network based on an additional semantic scene graph generated for the digital image utilizing the scene graph generation neural network and the semantic scene graph.

19. The non-transitory computer readable storage medium as recited in claim 18, further comprising instructions that, when executed by the at least one processor, cause the computing device to generate the semantic scene graph by:

determining the similarity metrics between pairs of the label graph embeddings and the visual graph embeddings;

determining one-to-one correspondences between the label graph embeddings and the visual graph embeddings based on the similarity metrics; and align the ungrounded label graph and the visual graph according to the one-to-one correspondences.

20. The non-transitory computer readable storage medium as recited in claim 18, further comprising instructions that, when executed by the at least one processor, cause the computing device to:

determine a contrastive loss by comparing the label graph embeddings to a plurality of positive visual graph embeddings and a plurality of negative visual graph embeddings; and modify parameters one or more embedding models utilized to generate the visual graph embeddings and the label graph embeddings based on the contrastive loss.

* * * * *